United States Patent [19]
Mihara et al.

[11] Patent Number: 5,934,890
[45] Date of Patent: Aug. 10, 1999

[54] SCROLL FLUID MACHINE HAVING A ROTATING PREVENTING MECHANISM INCLUDING A RESILIENT MEMBER

[75] Inventors: Hiroyuki Mihara; Kazutaka Suefuji, both of Kanagawa-ken; Toshikazu Harashima; Yuji Komai, both of Tokyo, all of Japan

[73] Assignee: Tokico Ltd., Kawasaki, Japan

[21] Appl. No.: 08/859,292

[22] Filed: May 20, 1997

[30] Foreign Application Priority Data

May 20, 1996 [JP] Japan .................................. 8-148689

[51] Int. Cl.⁶ .............................. F01C 1/04; F16D 3/04
[52] U.S. Cl. .......................................... 418/55.3; 464/102
[58] Field of Search .............................. 418/55.3; 464/102

[56] References Cited

U.S. PATENT DOCUMENTS

| | | | |
|---|---|---|---|
| 4,371,323 | 2/1983 | Fischer et al. | 418/55.3 |
| 5,403,172 | 4/1995 | Blass et al. | 418/55.3 |

FOREIGN PATENT DOCUMENTS

| | | | |
|---|---|---|---|
| 63-219916 | 9/1988 | Japan | 464/102 |
| 3-15603 | 1/1991 | Japan | 418/55.3 |
| 145754 | 5/1931 | Switzerland | 464/102 |

*Primary Examiner*—John J. Vrablik
*Attorney, Agent, or Firm*—Wenderoth, Lind & Ponack, LLP

[57] ABSTRACT

Joint guides comprise mutually opposing guide portions formed on a casing and mutually opposing guide portions provided on an orbiting scroll member. A plate spring is integrally attached to a part of each guide portion. Even when a load due to rotational torque from the orbiting scroll member acts on each slider from a loading-side guide portion, resilient force from the plate spring presses a sliding surface of the slider toward a sliding surface of the loading-side guide portion, thereby preventing the formation of a gap between the sliding surface of each slider and a convexly curved portion of the associated plate spring or between the sliding surface of each slider and the sliding surface of the associated guide portion, and thus preventing the occurrence of a rattle.

5 Claims, 23 Drawing Sheets

SCROLL FLUID MACHINE HAVING A ROTATING PREVENTING MECHANISM INCLUDING A RESILIENT MEMBER

BACKGROUND OF THE INVENTION

The present invention relates to a scroll fluid machine which is suitably used as an air compressor, a vacuum pump, etc. by way of example.

A known scroll fluid machine has a casing and a fixed scroll member integral with the casing. An orbiting scroll member is orbitably provided in the casing to define a plurality of compression chambers between the orbiting and fixed scroll members. The scroll fluid machine further has a rotation preventing mechanism for preventing the orbiting scroll member from rotating on its own axis.

In this type of conventional scroll fluid machine, a driving shaft is externally driven to rotate, causing the orbiting scroll member to perform an orbiting motion with a predetermined eccentricity with respect to the fixed scroll member, thereby sucking a fluid, e.g. air, from a suction opening provided at the outer periphery of the fixed scroll member, and successively compressing the fluid in the compression chambers formed between the wraps of the fixed and orbiting scroll members. Finally, the compressed fluid is discharged to the outside from a discharge opening provided in the center of the fixed scroll member.

A known structure of the rotation preventing mechanism according to the above-described conventional technology has a first joint guide provided on the casing and a second joint guide provided on the back of the orbiting scroll member. A movable joint is provided between the first and second joint guides and guided by the two joint guides in the directions of two axes perpendicularly intersecting each other.

In the rotation preventing mechanism arranged as described above, the movable joint is slidingly displaced relative to the first joint guide in the axis direction, for example, during a compression operation, and while doing so, the movable joint is slidingly displaced relative to the second joint guide in the X-axis direction, for example.

Thus, a load due to rotational torque from the orbiting scroll member is borne by the movable joint through each joint guide, thereby preventing the orbiting scroll member from rotating on its own axis while allowing it to perform an orbiting motion.

In the above-described scroll fluid machine according to the conventional technology, the movable joint is moved (i.e. guided) to slide in the X- and Y-axis directions through the respective joint guides during a compression operation. Therefore, it is likely that a gap will be produced by wear or the like between the sliding surfaces of the movable joint and each joint guide. Such a gap may also be formed on account of machining errors in production of the movable joint and each joint guide.

If such a gap is produced between the sliding surfaces, when a load due to rotational torque from the orbiting scroll member acts on the movable joint, a rattle occurs between the movable joint and each joint guide. The rattle is likely to generate noise (i.e. rattling noise) and makes it difficult to enable the movable joint and the orbiting scroll member to slide smoothly.

If a rattle occurs between the sliding surfaces of the movable joint and each joint guide, the sliding surfaces frequently collide with each other. Consequently, it is likely that each sliding surface will be irregularly worn.

In view of the above-described problems with the conventional technology, an object of the present invention is to provide a scroll fluid machine in which a movable joint of a rotation preventing mechanism is allowed to slide smoothly relative to each joint guide, thereby preventing generation of rattling or other noise during a compression operation and also preventing the sliding surfaces of the movable joint and each joint guide from being irregularly worn, and thus enabling the scroll fluid machine to exhibit a stable performance for a long period of time.

BRIEF SUMMARY OF THE INVENTION

The present invention is applicable to a scroll fluid machine including a casing and a fixed scroll member integral with the casing. An orbiting scroll member is orbitably provided in the casing to define a plurality of compression chambers between the orbiting and fixed scroll members. The scroll fluid machine further has a rotation preventing mechanism for preventing the orbiting scroll member from rotating on its own axis.

An arrangement adopted by the present invention is characterized in that the rotation preventing mechanism includes a first joint guide provided on the casing; a second joint guide provided on the back of the orbiting scroll member; and a movable joint provided between the first and second joint guides and guided by the two joint guides along two axes perpendicularly intersecting each other, and that the first and second joint guides each have sliding surfaces facing each other, and a resilient member is provided between at least one of the joint guides and the movable joint at a position adjacent to a part of at least one of the sliding surfaces such that the resilient member resiliently presses the movable joint against the other sliding surface of the same joint guide.

By virtue of the above-described arrangement, even when a load due to rotational torque from the orbiting scroll member acts on the movable joint, the movable joint can be resiliently pressed against the sliding surface of the joint guide as a mating member against the applied load. Therefore, it is possible to prevent the formation of a gap between the sliding surfaces of the movable joint and the joint guide and hence possible to prevent the occurrence of a rattle between the sliding surfaces of the two. Even if the sliding surfaces of the movable joint and each joint guide have become worn, the movable joint can be surely kept in sliding contact with the sliding surface of each joint guide by making use of the pressing force from the resilient member.

BRIEF DESCRIPTION OF THE SEVERAL VIEWS OF THE DRAWINGS

in FIG. 18.

in FIG. 28.

in FIG. 31.

in FIG. 33.

DETAILED DESCRIPTION OF THE INVENTION

Figure 1:
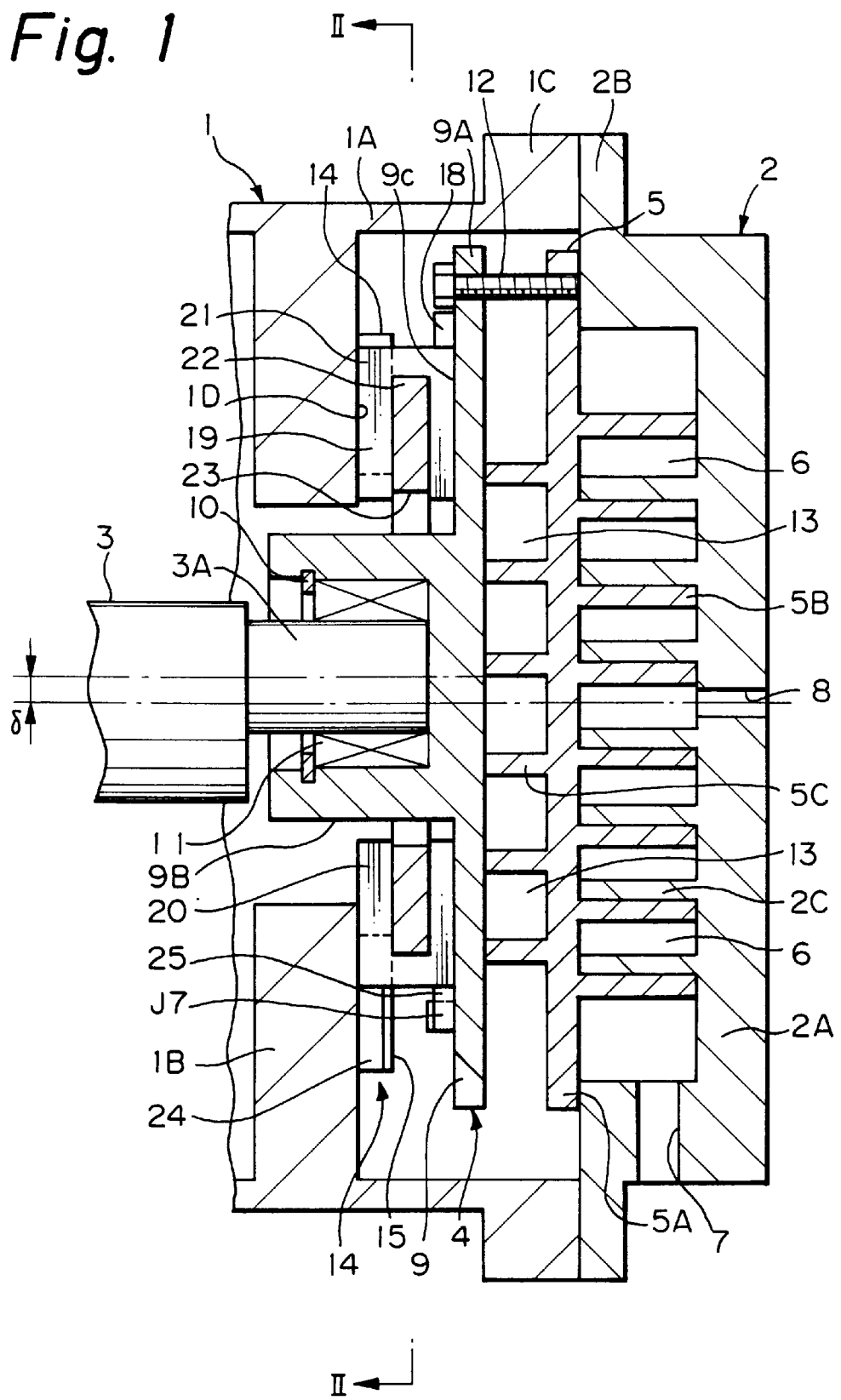
FIG. 1 is a longitudinal sectional view of a scroll air compressor according to a first embodiment of the present invention.

Embodiments of the scroll fluid machine according to the present invention will be described below by way of examples in which the present invention is applied to a scroll air compressor.

A first embodiment of the present invention will be described with reference to FIGS. 1 to 4.

As shown in the figures, a stepped cylinder-shaped casing 1 forms the body of the scroll air compressor. The casing 1 has a casing body 1A in the shape of a cylinder, one end of which is closed (the bottom side of the casing body 1A is not shown in the figures). An annular thrust bearing portion 1B extends radially inward from the inner peripheral surface of the casing body 1A. An annular butt portion 1C projects radially outward from the open end of the casing body 1A. A bearing portion (not shown) is provided on the bottom side of the casing 1 to support a driving shaft 3 (described later).

Of end surfaces of the thrust bearing portion 1B, an end surface closer to a fixed scroll member 2 (described later) has a sliding surface 1D defined between Y-axis guide portions 15 and 16. A movable plate 19 (described later) slides on the sliding surface 1D.

The fixed scroll member 2 is integrally provided on the open end of the casing 1. The fixed scroll member 2 has an approximately disk-shaped end plate 2A disposed such that the center of the end plate 2A is coincident with the axis of the driving shaft 3. A mounting flange portion 2B projects from the outer edge of the end plate 2A and is fixed at its outer periphery to the butt portion 1C of the casing 1 through bolts. A spiral wrap 2C is provided on the end plate 2A so as to project axially from the surface of the end plate 2A. The center of the wrap 2C is a spiral starting end, and the outer peripheral end of the wrap 2C is a spiral terminating end.

The driving shaft 3 is rotatably supported by the bearing portion of the casing 1 through bearings (not shown). The distal end of the driving shaft 3 extends into the casing 1 to form a crank 3A. The axis of the crank 3A is eccentric with respect to the axis of the driving shaft 3 by a predetermined dimension δ.

Figure 2:
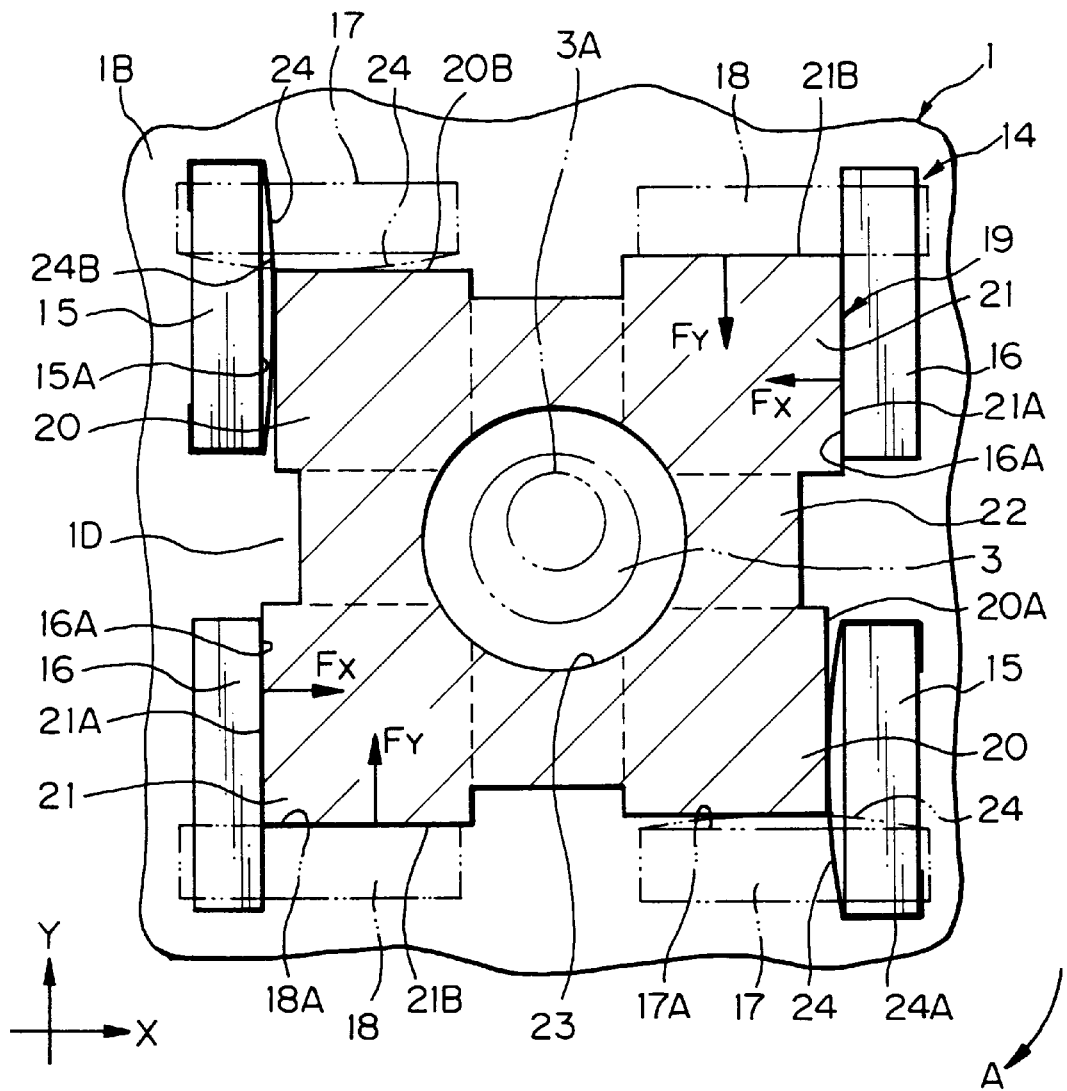
FIG. 2 is an enlarged sectional view as seen in the direction of the arrow II—II in FIG. 1, showing guide portions provided on a casing, a movable plate, and so forth.

The proximal end of the driving shaft 3 projects out from the casing 1 and is connected to a drive source (not shown). When the driving shaft 3 is driven to rotate in the direction of the arrow A as shown in FIG. 2 by the drive source, an orbiting scroll member 4 (described later) is caused to perform an orbiting motion through the crank 3A. A counterweight (not shown) is secured to the proximal end of the crank 3A to balance the rotation of the whole driving shaft 3 with the orbiting motion of the orbiting scroll member 4.

The orbiting scroll member 4 is orbitably provided in the casing 1 opposite to the fixed scroll member 2. The orbiting scroll member 4 has an integral structure comprising an orbiting scroll body 5 (described later) and a plate-shaped cover 9 provided at the back of the orbiting scroll body 5.

The orbiting scroll body 5 has an end plate 5A formed in the shape of a disk. A spiral wrap 5B is provided on the end plate 5A so as to project axially from the surface of the end plate 5A. The center of the wrap 5B is a spiral starting end, and the outer peripheral end of the wrap 5B is a spiral terminating end. Radiating fins 5C are provided on the back of the end plate 5A.

The wrap 5B of the orbiting scroll body 5 is disposed to overlap the wrap 2C of the fixed scroll member 2 with a predetermined offset angle. Thus, a plurality of compression chambers 6 are formed between the two wraps 2C and 5B.

During running of the scroll air compressor, air is sucked into a compression chamber 6 arriving at the outer periphery through a suction opening 7 provided at the outer periphery of the fixed scroll member 2. The sucked air is successively compressed in the compression chambers 6 while the orbiting scroll member 4 is performing an orbiting motion. Finally, the compressed air is discharged to the outside from the compression chamber 6 having moved to the center through a discharge opening 8 provided in the center of the fixed scroll member 2.

The plate-shaped cover 9, which is provided at the back of the orbiting scroll body 5, has a cover body 9A formed in the shape of a stepped disk having approximately the same diameter as that of the end plate 5A of the orbiting scroll body 5, as shown in FIG. 1. The plate-shaped cover 9 further has a boss portion 9B projecting axially from the center of the cover body 9A. An orbiting bearing 11 is accommodated in the boss portion 9B through an annular cover plate 10.

The plate-shaped cover 9 has the cover body 9A integrally mounted on the orbiting scroll body 5 through bolts 12 such that the cover body 9A abuts on the distal end surfaces of the radiating fins 5C. The boss portion 9B is rotatably mounted on the crank 3A of the driving shaft 3 through the orbiting bearing 11.

The back of the plate-shaped cover 9 has a sliding surface 9C defined between X-axis guide portions 17 and 18. The movable plate 19 slides on the sliding surface 9C. The plate-shaped cover 9 defines cooling air passages 13 between it and the back of the end plate 5A of the orbiting scroll body 5 through the radiating fins 5C. Thus, high-temperature heat of compression generated in each compression chamber 6 is efficiently dissipated from the back of the end plate 5A to the cooling air passages 13 through the radiating fins 5C, and thus cooling efficiency in each compression chamber 6 is increased.

A rotation preventing mechanism 14 prevents the orbiting scroll member 4 from rotating around its own axis. As shown in FIGS. 1 and 2, the rotation preventing mechanism 14 comprises the Y-axis guide portions 15 and 16, the X-axis guide portions 17 and 18, and the movable plate 19. The movable plate 19 is slidingly displaced in the X- and Y-axis directions relative to the guide portions 15, 16, 17 and 18, thereby preventing rotation of the orbiting scroll member 4, which is integral with the X-axis guide portions 17 and 18, while allowing the orbiting scroll member 4 to perform a circular motion (i.e. orbiting motion) with a predetermined orbiting radius. Thus, the rotation preventing mechanism 14 constitutes an Oldham's coupling.

Figure 3:
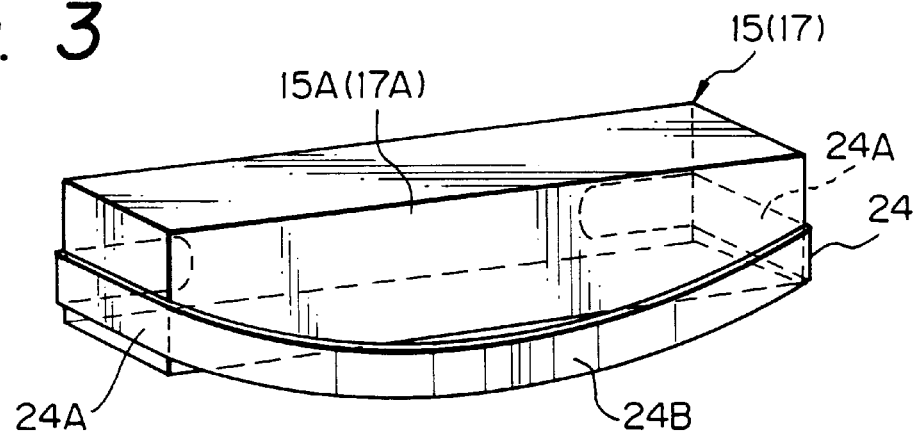
FIG. 3 is an enlarged perspective view of a guide portion and a plate spring in FIG. 2 as seen from the convexly curved side of the plate spring.
Figure 4:
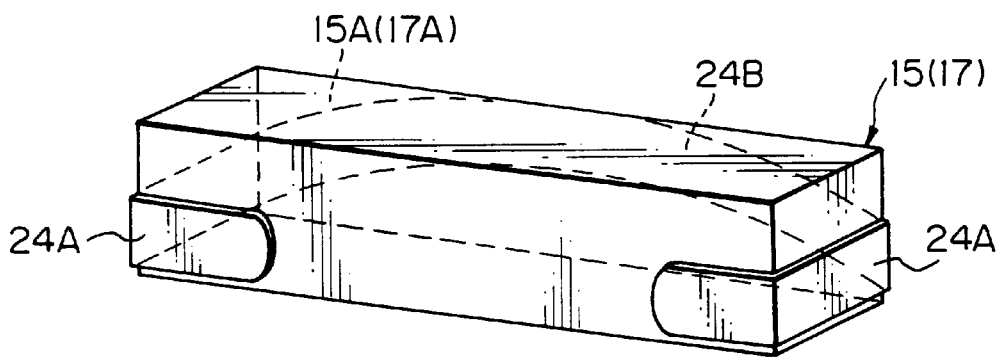
FIG. 4 is an enlarged perspective view of the guide portion and the plate spring in FIG. 3 as seen from the latching side of the plate spring.

The pair of Y-axis guide portions 15 are integrally provided on the sliding surface 1D of the casing 1. The Y-axis guides 15 constitute a first joint guide comprising a total of four guide portions in combination with another pair of Y-axis guide portions 16 which are integrally provided on the sliding surface 1D of the casing 1 as in the case of the Y-axis guide portions 15. As shown in FIGS. 2 through 4, the Y-axis guide portions 15 and 16 are each formed in the shape of an elongated square plate. The Y-axis guide portions 15 and 16 are apart from each other in the X- and Y-axis directions and extend parallel to the Y-axis direction.

Of the Y-axis guide portions 15 and 16, the Y-axis guide portions 15 are disposed at the upper left and lower right positions, respectively, as viewed in FIG. 2. Each Y-axis guide portion 15 has a plate spring 24 (described later) provided on its inner side surface 15A. The Y-axis guide portions 16 are disposed at the lower left and upper right positions, respectively, in FIG. 2. An inner side surface of each Y-axis guide portion 16 that faces the inner side surface 15A in the X-axis direction serves as a sliding surface 16A mated with a sliding surface 21A of the movable plate 19. When the orbiting scroll member 4 orbits in the clockwise direction (i.e. the direction of the arrow A), a load due to the orbiting motion of the orbiting scroll member 4 acts on each Y-axis guide portion 16, but no load acts on each Y-axis guide portion 15.

The movable plate 19 is fitted between the Y-axis guide portions 15 and 16 through the plate springs 24 to allow the sliding displacement of the movable plate 19 in the Y-axis direction relative to the casing 1 while restricting sliding displacement of the movable plate 19 in the X-axis direction.

During an orbiting motion of the orbiting scroll member 4, a load due to rotational torque from the orbiting scroll member 4 acts to a considerable extent on the Y-axis guide portions 16 of the Y-axis guide portions 15 and 16 in the direction of the arrow FX through the movable plate 19, as described later. Accordingly, the Y-axis guide portions 16 are loading-side guide portions. The Y-axis guide portions 15 are subjected to substantially no load from the orbiting scroll member 4 and hence non-loading-side guide portions (see FIG. 2). In other words, each Y-axis guide portion 15 constitutes a guide portion on a non-loading side where the effect of the load is small, and each Y-axis guide portion 16 constitutes a guide portion on a loading side where the effect of the load is large.

It should be noted that the size of the load in the direction of the arrow FX changes with the change in pressure of compressed air discharged from the discharge opening 8.

The pair of X-axis guide portions 17 are integrally provided on the sliding surface 9C of the orbiting scroll member 4. The X-axis guide portions 17 constitute a second joint guide comprising a total of four guide portions in combination with another pair of X-axis guide portions 18 which are integrally provided on the sliding surface 9C of the orbiting scroll member 4. As shown in FIGS. 2 through 4, the X-axis guide portions 17 and 18 are each formed in the shape of an elongated square plate as in the case of the guide portions 15 and 16. The X-axis guide portions 17 and 18 are apart from each other in both the X- and Y-axis directions and extend parallel to the X-axis direction.

Of the X-axis guide portions 17 and 18, the X-axis guide portions 17 are disposed at the upper left and lower right positions, respectively, as viewed in FIG. 2. Each X-axis guide portion 17 has a plate spring 24 provided on its inner side surface 17A. The X-axis guide portions 18 are disposed at the lower left and upper right positions, respectively, in FIG. 2. A side surface of each X-axis guide portion 18 that faces the inner side surface 17A in the Y-axis direction serves as a sliding surface 18A mated with a sliding surface 21B of the movable plate 19.

The movable plate 19 is fitted between the X-axis guide portions 17 and 18 through the plate springs 24 to allow the sliding displacement of the orbiting scroll member 4 in the X-axis direction relative to the movable plate 19 while restricting sliding displacement of the orbiting scroll member 4 in the Y-axis direction.

During an orbiting motion of the orbiting scroll member 4, a load due to rotational torque from the orbiting scroll member 4 acts to a considerable extent on the X-axis guide portions 18 of the X-axis guide portions 17 and 18 in the direction of the arrow FY through the movable plate 19, as described later, whereas the X-axis guide portions 17 are subjected to substantially no load from the orbiting scroll member 4 (see FIG. 2). In other words, each X-axis guide portion 17 constitutes a guide portion where the effect of the load is small, and each X-axis guide portion 18 constitutes a guide portion where the effect of the load is large.

It should be noted that the size of the load in the direction of the arrow FY changes with the change in pressure of compressed air discharged from the discharge opening 8.

The movable plate 19 operates as a movable joint slidably disposed between the Y-axis guide portions 15 and 16, which are provided on the casing 1, and between the X-axis guide portions 17 and 18, which are provided on the orbiting scroll member 4. The movable plate 19 is formed in such a shape as shown in FIGS. 1 and 2 and from a resin material having wear resistance, for example.

The movable plate 19 includes a pair of sliders 20 formed from a thick-walled plate material with an approximately square external shape and disposed at respective positions corresponding to the guide portions 15 and 17. The movable plate 19 includes another pair of sliders 21 formed from a thick-walled plate material with an approximately square external shape as in the case of the sliders 20 and disposed at respective positions corresponding to the guide portions 16 and 18. The movable plate 19 further includes thin-walled connecting plates 22 that connect the sliders 20 and 21 in the X- and Y-axis directions. In addition, the center of the movable plate 19 is provided with a clearance hole 23 for the boss portion 9B of the plate-shaped cover 9.

Each slider 20 is formed in the shape of a square of predetermined dimensions smaller than the sliders 21 to provide slight gaps for installation of the plate springs 24 between the sliders 20 and the inner side surfaces 15A and 17A of the guide portions 15 and 17. Outer side surfaces of each slider 20 that extend in the Y- and X-axis directions serve as sliding surfaces 20A and 20B with respect to the plate springs 24, respectively. Outer side surfaces of each slider 21 that extend in the Y- and X-axis directions serve as sliding surfaces 21A and 21B with respect to the sliding surfaces 16A and 18A of the guide portions 16 and 18.

The movable plate 19 is disposed such that one end surface in the direction of the thickness of each of the sliders 20 and 21 is slidable relative to the sliding surface 1D of the casing 1 and the other end surface of each of the sliders 20 and 21 is slidable relative to the sliding surface 9C of the orbiting scroll member 4. The movable plate 19 is guided by the guide portions 15 and 16 so as to be slidable in the Y-axis direction relative to the sliding surface 1D and also guided by the guide portions 17 and 18 so as to be slidable in the X-axis direction relative to the sliding surface 9C.

The plate springs 24 serve as resilient members fitted to the guide portions 15 and 17. Each plate spring 24 is formed as shown in FIGS. 2 through 4 by pressing an approximately rectangular metal plate or the like having spring properties.

Each plate spring 24 has left and right end portions bent inwardly in an approximately L-shaped configuration to form latching portions 24A. An elastically deformable convexly curved portion 24B is provided between the latching portions 24A. The plate springs 24 are mounted on the guide portions 15 and 17 by engaging the latching portions 24A with the longitudinal ends of the guide portion 15 (17) such that the convexly curved portion 24B resiliently and slidingly contacts (i.e. abuts on) the sliding surface 20A (20B) of the associated slider 20. It is preferable that the latching portions 24A be rigidly secured to the guide portions 15 and 17 by using an adhesive or the like.

Each plate spring 24 is arranged such that even when a load due to rotational torque from the orbiting scroll member 4 acts on the movable plate 19 in each of the directions of the arrows FY and FX shown in FIG. 2 as described later, the plate spring 24 applies resilient force opposite in direction to the applied load to the movable plate 19 by the convexly curved portion 24B. Consequently, the sliding surfaces 21A and 21B of the sliders 21 are constantly pressed against the sliding surfaces 16A and 18A of the guide portions 16 and 18, respectively.

The compression operation of the scroll air compressor according to this embodiment will be described below.

First, when the driving shaft 3 is rotated in the direction of the arrow A by the drive source, the orbiting scroll member 4 is driven to perform an orbiting motion. Consequently, the compression chambers 6, which are defined between the wrap 2C of the fixed scroll member 2 and the wrap 5B of the orbiting scroll body 5, are continuously contracted. Thus, the outside air sucked in from the suction opening 7 of the fixed scroll member 2 is successively compressed in the compression chambers 6, and the compressed air is discharged from the discharge opening 8 of the fixed scroll member 2 to an external air tank or the like.

Next, the operation of the rotation preventing mechanism 14, which comprises the guide portions 15, 16, 17 and 18 and the movable plate 19, will be described.

First, when the driving shaft 3 rotates in the direction of the arrow A, the movable plate 19 allows the sliding surface 9C of the orbiting scroll member 4 to be displaced in the X-axis direction relative to the movable plate 19 by sliding of the sliding surfaces 20B of the sliders 20 on the plate springs 24, which are provided on the guide portions 17, and sliding of the sliding surfaces 21B of the sliders 21 on the sliding surfaces 18A of the guide portions 18. At the same time, the movable plate 19 is displaced in the Y-axis direction relative to the sliding surface 1D of the casing 1 by sliding of the sliding surfaces 20A of the sliders 20 on the plate springs 24, which are provided on the guide portions 15, and sliding of the sliding surfaces 21A of the sliders 21 on the sliding surfaces 16A of the guide portions 16.

The rotational motion of the driving shaft 3 causes a rotational torque to act on the orbiting scroll member 4 in the direction of the arrow A. Consequently, the X-axis guide portions 18 of the X-axis guide portions 17 and 18, which are integral with the orbiting scroll member 4, are strongly pressed against (i.e. brought into sliding contact with) the sliding surfaces 21B of the sliders 21 by the rotational torque.

As a result, the rotational torque is applied as a heavy load to the sliding surfaces 21B of the sliders 21 from the sliding surfaces 18A of the X-axis guide portions 18 in the direction of the arrow FY. The load causes the sliding surfaces 21A of the sliders 21 to be strongly pressed against (i.e. brought into sliding contact with) the sliding surfaces 16A of the Y-axis guide portions 16. Consequently, the load from the sliding surface 16A acts on the sliding surface 21A to a considerable extent as reaction force in the direction of the arrow FX. Meanwhile, the guide portions 15 and 17 are subjected to substantially no load due to the rotational torque.

That is, the load due to rotational torque from the orbiting scroll member 4 is borne through the contact between the sliding surfaces 18A and 21B and through the contact between the sliding surfaces 16A and 21A, thereby preventing the orbiting scroll member 4 from rotating on its own axis in the direction of the arrow A while allowing the orbiting scroll member 4 to perform an orbiting motion with the predetermined orbiting radius δ.

During the orbiting motion of the orbiting scroll member 4, sliding resistance acts between the sliding surfaces 20A and 20B of the sliders 20 and the convexly curved portions 24B of the plate springs 24 and between the guide portions 16 and 18 and the sliding surfaces 16A, 18A, 21A and 21B of the sliders 21. Therefore, wear is likely to occur over the whole surface of each of the sliding surfaces 16A, 18A, 20A, 20B, 21A and 21B and the convexly curved portions 24B.

However, in this embodiment, the plate springs 24, which are mounted on the Y-axis and X-axis guide portions 15 and 17, resiliently press the sliding surfaces 21A and 21B of the sliders 21 against the mated sliding surfaces 16A and 18A of the guide portions 16 and 18. Therefore, even when a load due to rotational torque from the orbiting scroll member 4 acts on the sliders 21 from the guide portions 16 and 18 in the directions of the arrows FX and FY, it is possible to surely prevent the formation of a gap between the sliding surfaces 16A and 18A of the guide portions 16 and 18 on the one hand and the sliding surfaces 21A and 21B of the sliders 21 on the other.

Accordingly, it is possible in this embodiment to surely prevent the occurrence of a rattle between the movable plate 19 and any of the guide portions 15, 16, 17 and 18. Even when a load due to rotational torque from the orbiting scroll member 4 acts on the movable plate 19, the movable plate 19 can smoothly slide between the guide portions 15, 16, 17 and 18. Moreover, it is possible to effectively reduce noise due to the rattle. Thus, it is possible to ensure a stable operation of the scroll air compressor for a long period of time.

In addition, it is possible to prevent the sliders 20 and the plate springs 24 from colliding with each other and also possible to prevent the sliders 21 and the guide portions 16 and 18 from colliding with each other. Accordingly, it is possible to surely prevent the occurrence of irregular wear in the sliding surfaces 16A and 18A of the guide portions 16 and 18, the sliding surfaces 20A and 20B of the sliders 20 and the convexly curved portions 24B of the plate springs 24. Thus, the lifetime of the scroll air compressor can be extended to a considerable extent.

Further, it becomes unnecessary to increase the machining accuracy of the movable plate 19 and the guide portions 15, 16, 17 and 18 in order to bring the movable plate 19 into sliding contact with the guide portions 15, 16, 17 and 18 without an undesired gap. Accordingly, the production cost of the movable plate 19 and the guide portions 15, 16, 17 and 18 can be reduced to a-considerable extent.

Meanwhile, the plate springs 24 are provided on the guide portions 15 and 17, on which the load due to rotational torque from the orbiting scroll member 4 has less influence. Therefore, the plate springs 24 can be effectively prevented from being broken or damaged by the load. Thus, the lifetime of the plate springs 24 can be increased to a considerable extent, and the lifetime of the scroll air compressor can be further extended.

Figure 5:
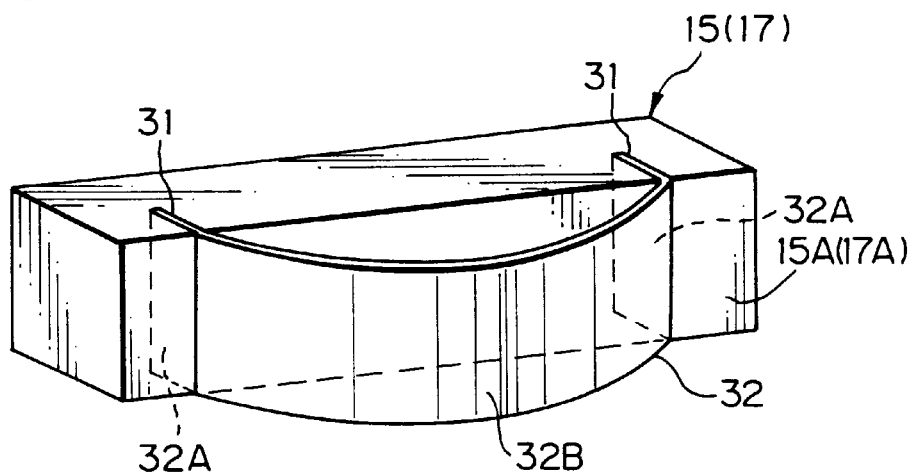
FIG. 5 is a perspective view of a guide portion and a plate spring of a scroll air compressor according to a second embodiment of the present invention.

FIG. 5 shows a second embodiment of the present invention. In this embodiment, the same constituent elements as those in the first embodiment are denoted by the same reference characters, and a description thereof is omitted. The feature of this embodiment resides in that each of the guide portions 15 and 17 is provided with a pair of grooves 31, and a plate spring 32 as a resilient member is mounted on each of the guide portions 15 and 17 through the grooves 31.

The pair of grooves 31 are formed at a predetermined interval on the inner side surface 15A (17A) of each of the guide portions 15 and 17. The grooves 31 extend in the shape of a slit in the direction of the thickness of the guide portion 15 (17). The plate spring 32 has a structure approximately similar to that of the plate springs 24 described in the first embodiment. The plate spring 32 has a convexly curved portion 32B. However, both ends of the plate spring 32 are flat plate-shaped fixed portions 32A. The plate spring 32 is mounted by inserting the fixed portions 32A into the grooves 31, respectively. In this case, an adhesive may be used to surely secure the fixed portions 32A in the grooves 31.

In this embodiment also, the convexly curved portion 32B of the plate spring 32 can be resiliently pressed to abut on the sliding surface 20A (20B) of the associated slider 20. Thus, it is possible to obtain advantageous effects approximately similar to those in the first embodiment.

Figure 6:
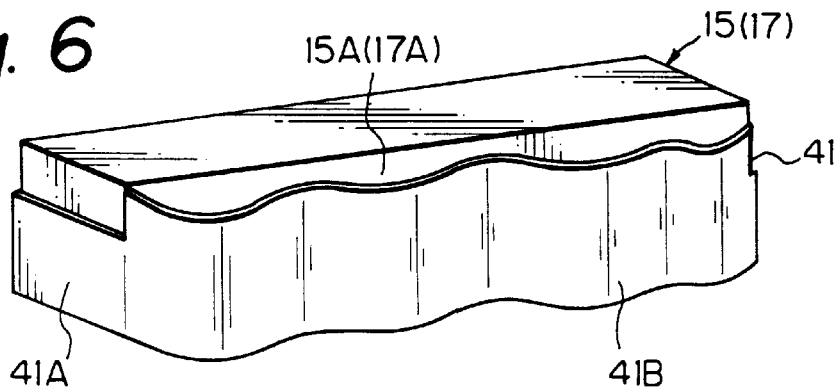
FIG. 6 is a perspective view of a guide portion and a plate spring of a scroll air compressor according to a third embodiment of the present invention.

FIG. 6 shows a third embodiment of the present invention. In this embodiment, the same constituent elements as those in the first embodiment are denoted by the same reference characters, and a description thereof is omitted. The feature of this embodiment resides in that a plate spring 41 as a resilient member is provided on each of the guide portions 15 and 17 in place of the plate spring 24 described in the first embodiment.

The plate spring 41 has a structure approximately similar to that of the plate springs 24 described in the first embodiment. That is, the plate spring 41 has a pair of latching portions 41A (only one of them is illustrated in the figure). However, the convexly curved portion 41B of the plate spring 41 is wavily curved in the longitudinal direction.

In this embodiment also, the convexly curved portion 41B of the plate spring 41 can be resiliently pressed to abut on the sliding surface 20A (20B) of the associated slider 20. Thus, it is possible to obtain advantageous effects approximately similar to those in the first embodiment.

Figure 7:
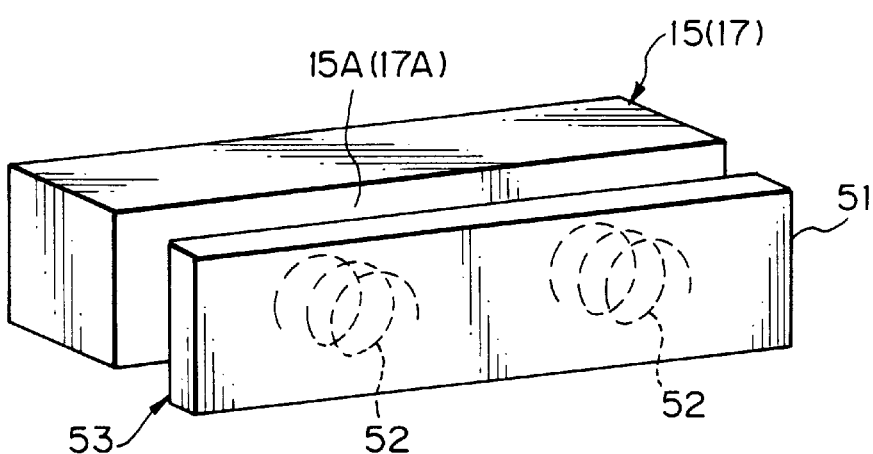
FIG. 7 is a perspective view of a guide portion and a plate spring of a scroll air compressor according to a fourth embodiment of the present invention.

FIG. 7 shows a fourth embodiment of the present invention. In this embodiment, the same constituent elements as those in the first embodiment are denoted by the same reference characters, and a description thereof is omitted. The feature of this embodiment resides in that each of the guide portions 15 and 17 is provided with a resilient member 53 comprising a pressing plate 51 and a pair of springs 52.

The pressing plate 51 is formed from an approximately rectangular flat plate extending in the longitudinal direction of the guide portion 15 (17). One side surface of the pressing plate 51 serves as a sliding surface for the sliding surface 20A (20B) of the associated slider 20 (i.e. the movable plate 19). A pair of springs 52 are provided between the pressing plate 51 and the inner side surface 15A (17A) of the guide portion 15 (17) at respective positions spaced apart from each other in the longitudinal direction of the inner side surface 15A (17A). The springs 52 constantly urge the pressing plate 51 toward the sliding surface 20A (20B) of the mated slider 20.

In this embodiment also, the pressing plate 51 can be resiliently pressed to abut on (i.e. brought in sliding contact with) the sliding surface 20A (20B) of the associated slider 20 through the springs 52. Thus, it is possible to obtain advantageous effects approximately similar to those in the first embodiment.

Figure 8:
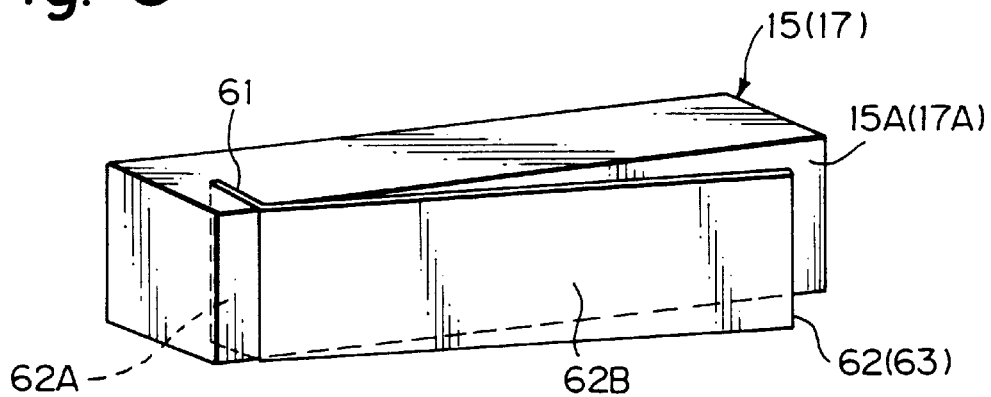
FIG. 8 is a perspective view of a guide portion and a plate spring of a scroll air compressor according to a fifth embodiment of the present invention.

FIG. 8 shows a fifth embodiment of the present invention. In this embodiment, the same constituent elements as those in the first embodiment are denoted by the same reference characters, and a description thereof is omitted. The feature of this embodiment resides in that a plate spring 62 as a resilient member is mounted on each of the guide portions 15 and 17 through a groove 61 provided in the inner side surface 15A (17A) thereof in place of the plate spring 24 described in the first embodiment.

The groove 61 is formed as in the case of the grooves 31 described in the second embodiment, and provided at one longitudinal end of the inner side surface 15A (17A). The plate spring 62 is formed in substantially the same way as in the third embodiment. The plate spring 62 is mounted by inserting a fixed portion 62A thereof into the groove 61. The plate spring 62 has an approximately rectangular pressing plate portion 62B extending from the fixed portion 62A at an angle thereto such that the plate spring 62 has an approximately V-shaped configuration as a whole. The distal end of the pressing plate portion 62B is a free end that resiliently abuts on (i.e. slidingly contacts) the sliding surface 20A (20B) of the associated slider 20.

With this embodiment also, it is possible to obtain advantageous effects approximately similar to those in the first embodiment.

Figure 9:
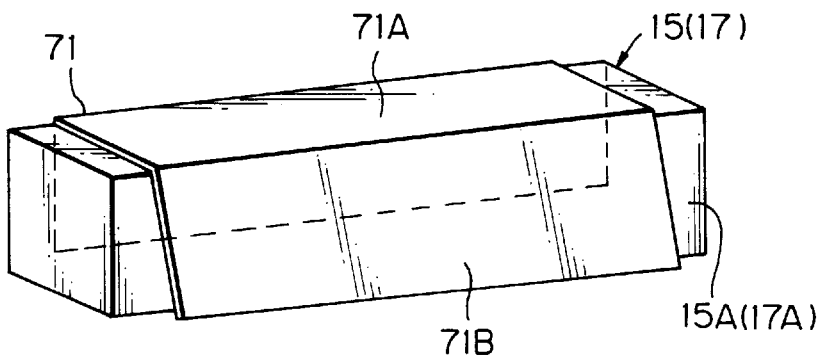
FIG. 9 is a perspective view of a guide portion and a plate spring of a scroll air compressor according to a sixth embodiment of the present invention.

FIG. 9 shows a sixth embodiment of the present invention. In this embodiment, the same constituent elements as those in the first embodiment are denoted by the same reference characters, and a description thereof is omitted. The feature of this embodiment resides in that a plate spring 71 as a resilient member is mounted on each of the guide portions 15 and 17 so as to extend over from the top to the outer side surface of the guide portion 15 (17) in place of the plate spring 24 described in the first embodiment.

The plate spring 71 is formed by bending a rectangular metal plate along two imaginary longitudinal lines. More specifically, the plate spring 71 has a mounting plate portion 71A that is bent in an L-shape and secured to both the top and the outer side surface of the guide portion 15 (17). The plate spring 71 further has a pressing plate portion 71B that extends from the forward end (as seen in FIG. 9) of the mounting plate portion 71A at an angle thereto in an approximately V-shaped configuration. The distal (i.e. lower) end of the pressing plate portion 71B is a free end separated from the inner side surface 15A (17A) such that the pressing plate portion 71B is elastically deformable. The distal end of the pressing plate portion 71B of the plate spring 71 resiliently abuts on (i.e. slidingly contacts) the sliding surface 20A (20B) of the associated slider 20 and thus constantly urges the slider 20 away from the inner side surface 15A (17A) of the guide portion 15 (17).

With this embodiment also, it is possible to obtain advantageous effects approximately similar to those in the first embodiment.

Figure 10:
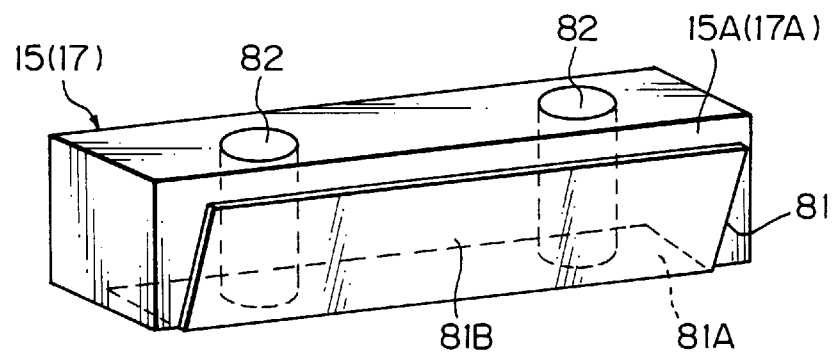
FIG. 10 is a perspective view of a guide portion and a plate spring of a scroll air compressor according to a seventh embodiment of the present invention.

FIG. 10 shows a seventh embodiment of the present invention. In this embodiment, the same constituent elements as those in the first embodiment are denoted by the same reference characters, and a description thereof is omitted. The feature of this embodiment resides in that a plate spring 81 as a resilient member is mounted on the bottom of each of the guide portions 15 and 17 in place of the plate spring 24 described in the first embodiment.

The plate spring 81 is formed in substantially the same way as in the sixth embodiment. The plate spring 81 has a mounting plate portion 81A and a pressing plate portion 81B. The mounting plate portion 81A is formed from an approximately rectangular flat plate. The mounting plate portion 81A is integrally secured to the bottom of the guide portion 15 (17) at two longitudinal ends thereof through a pair of pins 82, thus causing the pressing plate portion 81B to resiliently abut on (i.e. slidingly contact) the sliding surface 20A (20B) of the associated slider 20.

With this embodiment also, it is possible to obtain advantageous effects approximately similar to those in the first embodiment.

Figure 11:
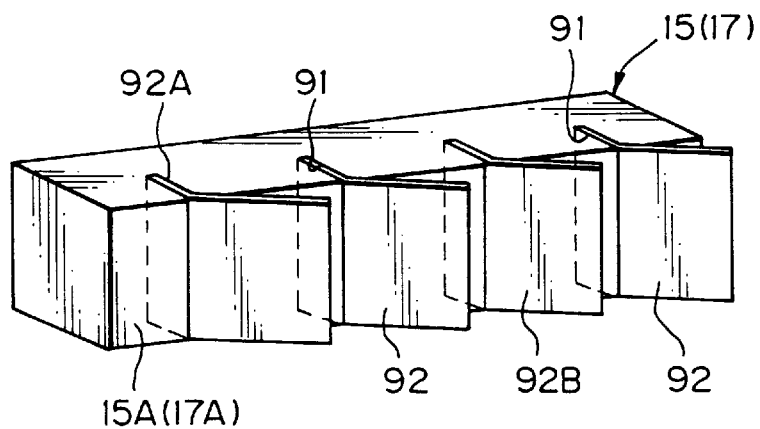
FIG. 11 is a perspective view of a guide portion and plate springs of a scroll air compressor according to an eighth embodiment of the present invention.

FIG. 11 shows an eighth embodiment of the present invention. In this embodiment, the same constituent elements as those in the first embodiment are denoted by the same reference characters, and a description thereof is omitted. The feature of this embodiment resides in that four grooves 91 are provided in the inner side surface 15A (17A) of each of the guide portions 15 and 17, and plate springs 92 as resilient members are mounted on each of the guide portions 15 and 17 by inserting them into the grooves 91, respectively.

The grooves 91 are formed as in the case of the grooves 31 described in the second embodiment. The grooves 91 are provided at approximately equal intervals in the longitudinal direction of the inner side surface 15A (17A). The plate springs 92 are approximately similar in structure to the plate spring 62 described in the fifth embodiment. Each plate spring 92 has a fixed portion 92A and a pressing plate portion 92B. The length of the pressing plate portion 92B is shorter than that of the pressing plate portion 62B of the plate spring 62. Each plate spring 92 is secured by inserting the fixed portion 92A into one of the grooves 91. Thus, the distal end of the pressing plate portion 92B resiliently abuts (i.e. slidingly contacts) the sliding surface 20A (20B) of the associated slider 20.

With this embodiment also, it is possible to obtain advantageous effects approximately similar to those in the first embodiment.

Figure 12:
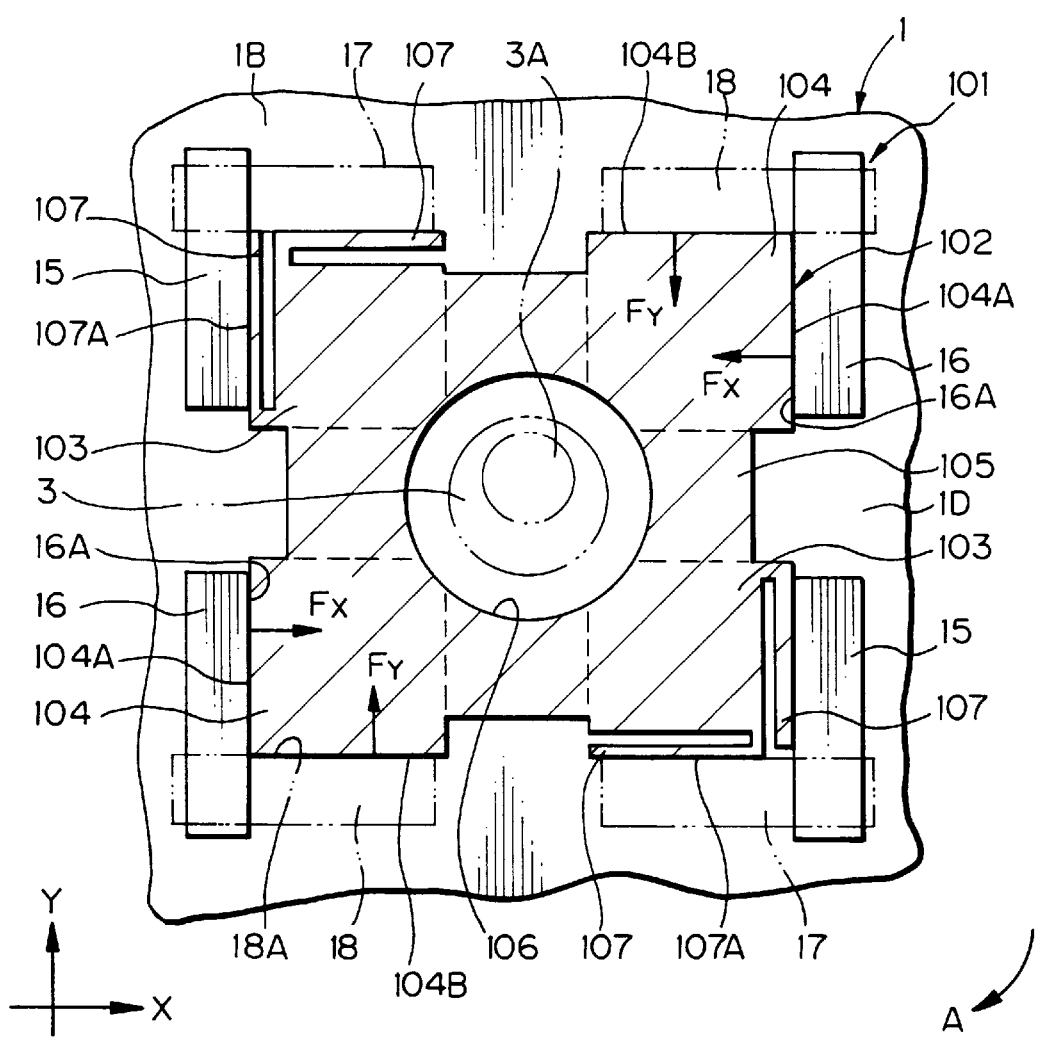
FIG. 12 is a sectional view similar to FIG. 2, showing a movable plate, guide portions, etc. of a scroll air compressor according to a ninth embodiment of the present invention.

FIG. 12 shows a ninth embodiment of the present invention. In this embodiment, the same constituent elements as those in the first embodiment are denoted by the same reference characters, and a description thereof is omitted. The feature of this embodiment resides in that a rotation preventing mechanism 101 comprises the guide portions 15, 16, 17 and 18 and a movable plate 102 as a movable joint, and that each slider 103 of the movable plate 102 is provided with an urging portion 107 as a resilient member, and further that sliding surfaces 104A and 104B of each slider 104 are resiliently pressed against the sliding surfaces 16A and 18A of the guide portions 16 and 18 by using the resilient force from each urging portion 107 against the loads applied in the directions of the arrows FX and FY by the rotational torque from the orbiting scroll member 4.

The movable plate 102 has sliders 103 and 104, connecting plates 105 and a clearance hole 106 as in the case of the movable plate 19 described in the first embodiment. In the movable plate 102, each slider 103 has an urging portion 107 integrally formed thereon. The urging portion 107 projects in an approximately L-shaped configuration from the outer side surface of the slider 103. The outer side surface of the distal end of the urging portion 107 serves as a sliding surface 107A that is resiliently placed in sliding contact with (i.e. abutting on) the sliding surface 15A (17A) of the associated guide portion 15 (17).

With this embodiment also, it is possible to obtain advantageous effects approximately similar to those in the first embodiment. In particular, according to this embodiment, the movable plate 102 is integrally provided with the urging portions 107 as resilient members, and thus the number of parts constituting the rotation preventing mechanism 101 can be surely reduced. Moreover, it is possible to surely prevent the urging portions 107 from coming off the movable plate 102 during a compression operation.

Figure 13:
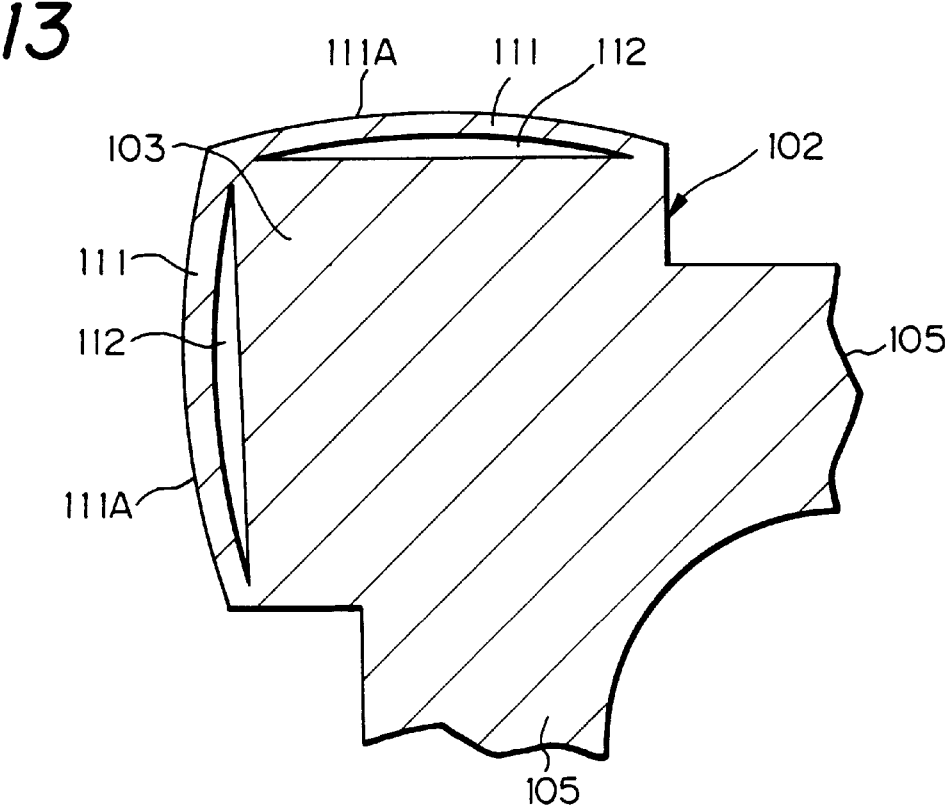
FIG. 13 is a fragmentary sectional view showing a movable plate and urging portions of a scroll air compressor according to a tenth embodiment of the present invention.

FIG. 13 shows a tenth embodiment of the present invention. In this embodiment, the same constituent elements as those in the ninth embodiment are denoted by the same reference characters, and a description thereof is omitted. The feature of this embodiment resides in that urging portions 111 as resilient members are integrally provided on the outer side surfaces of each slider 103 in place of the urging portions 107 described in the ninth embodiment, and that each urging portion 111 is formed as a convexly curved portion that is longitudinally arcuated.

The urging portions 111 are approximately similar in structure to the urging portions 107 described in the ninth embodiment. The outer side surface of each urging portion 111 serves as a sliding surface 111A. Each urging portion 111 extends longitudinally in an arcuate shape along the outer side surface of the slider 103. Both ends of the urging portion 111 are formed integral with the outer side surface. Thus, a crescent air gap 112 is formed between each urging portion 111 and the outer side surface of the slider 103. The air gap 112 allows elastic deformation of the urging portion 111.

With this embodiment also, it is possible to obtain advantageous effects approximately similar to those in the ninth embodiment.

Figure 14:
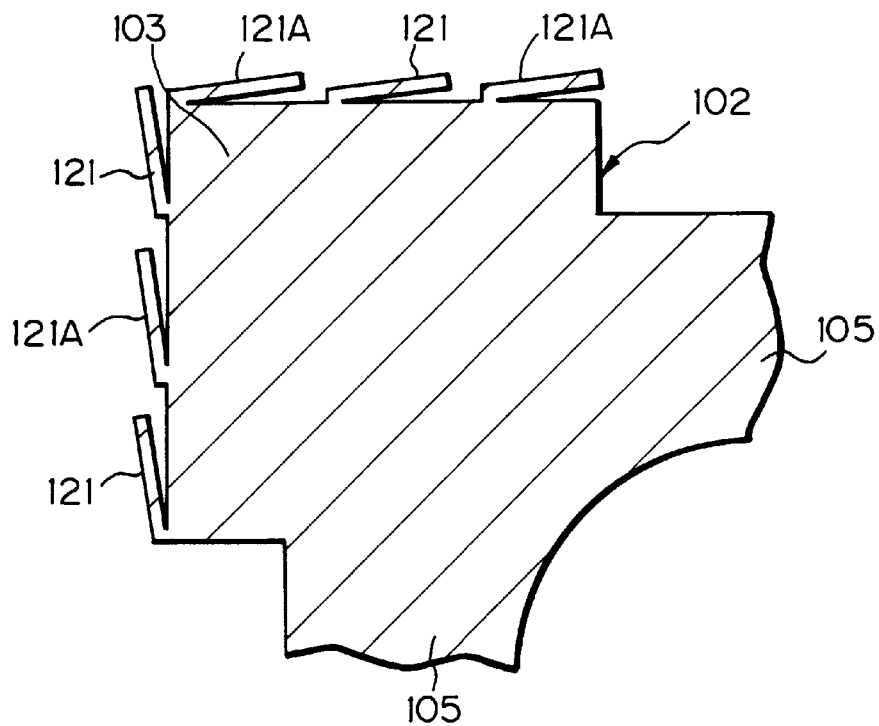
FIG. 14 is a sectional view similar to FIG. 13, showing a slider and urging portions of a scroll air compressor according to an eleventh embodiment of the present invention.

FIG. 14 shows an eleventh embodiment of the present invention. In this embodiment, the same constituent elements as those in the ninth embodiment are denoted by the same reference characters, and a description thereof is omitted. The feature of this embodiment resides in that a plurality of urging portions 121 as resilient members are integrally provided on an outer side surface of each slider 103 in place of each urging portion 107 described in the ninth embodiment.

The urging portions 121 are approximately similar in structure to the urging portions 107. The outer side surface of each urging portion 121 serves as a sliding surface 121A. The urging portions 121 are longitudinally spaced apart from each other on the outer side surface of the slider 103. The distal end of each urging portion 121 projects from the outer side surface of the slider 102 to a distance shorter than the urging portions 107 and resiliently abuts on the sliding surface 15A (17A) of the associated guide portion 15 (17).

With this embodiment also, it is possible to obtain advantageous effects approximately similar to those in the ninth embodiment.

Figure 15:
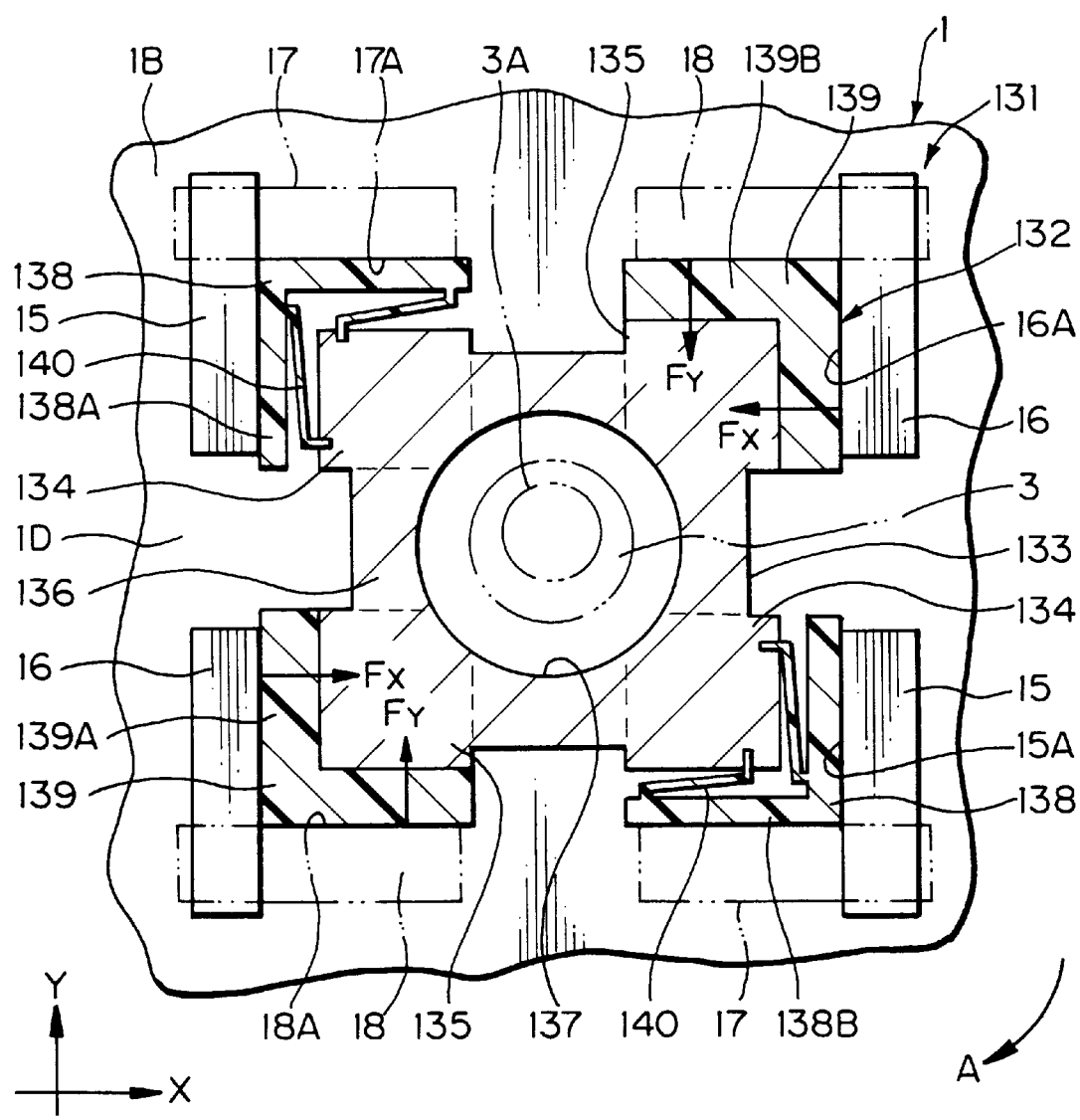
FIG. 15 is a sectional view similar to FIG. 2, showing a movable plate, guide portions, urging members, etc. of a scroll air compressor according to a twelfth embodiment of the present invention.

FIG. 15 shows a twelfth embodiment of the present invention. In this embodiment, the same constituent elements as those in the first embodiment are denoted by the same reference characters, and a description thereof is omitted. The feature of this embodiment resides in that a rotation preventing mechanism 131 comprises guide portions 15, 16, 17 and 18 and a movable plate 132, and that the movable plate 132 comprises a plate member 133 as a movable joint body which has sliders 134 and 135, connecting plates 136 and a clearance hole 137, and sliding members 138 and 139 as sliding portions which are provided for the sliders 134 and 135, respectively, of the plate member 133, and further that each sliding member 138 is integrally attached to the associated slider 134 through urging portions 140 as resilient members.

The plate member 133 comprises sliders 134 and 135, connecting plates 136, and a clearance hole 137 as in the case of the movable plate 19 described in the first embodiment. However, the plate member 133 is formed from a rigid material such that the overall configuration is smaller than the movable plate 19.

Each sliding member 138 is formed from a wear-resistant resin material or the like into a plate-shaped member bent in an approximately L-shaped configuration as a whole. Thus, each sliding member 138 has a Y-axis sliding plate portion 138A and an X-axis sliding plate portion 138B, which are slidable with respect to the guide portions 15 and 17, respectively. The sliding plate portions 138A and 138B each have an urging portion 140 integrally formed thereon.

Each urging portion 140 is formed in a plate-like shape as a whole from the same material as that of the sliding members 138 and 139. Each urging portion 140 projects in an approximately L-like shape from the inner side surface of each of the sliding plate portions 138A and 138B. The distal end of the urging portion 140 is further bent in an approximately L-like shape and integrally secured to the outer side surface of the associated slider 134.

Each sliding member 139 has a Y-axis sliding plate portion 139A and an X-axis sliding plate portion 139B as in the case of the sliding members 138. Each sliding member 139 is integrally mounted on the outer side surfaces of the associated slider 135.

The urging portions 140 cause the sliding plate portions 139A and 139B of the sliding members 139 to be resiliently pressed against the respective sliding surfaces 16A and 18A of the guide portions 16 and 18 against the loads applied in the directions of the arrows FX and FY by the rotational torque from the orbiting scroll member 4.

With this embodiment also, it is possible to obtain advantageous effects approximately similar to those in the first embodiment. In particular, according to this embodiment, the movable plate 132 comprises the plate member 133 and the sliding members 138 and 139. Therefore, the whole plate member 133 can be formed from a relatively inexpensive material, e.g. a metallic material, and thus the material cost can be reduced to a considerable extent. If the plate member 133 is formed by using a relatively lightweight material in place of the metallic material, the overall weight of the rotation preventing mechanism 131 can be reduced. Moreover, because the sliding members 138 can be brought into direct sliding contact with the guide portions 15 and 17, it is possible to reduce the surface pressure between the sliding plate portions 138A and 138B and the sliding surfaces 15A and 17A of the guide portions 15 and 17 and hence possible to minimize the sliding resistance. Accordingly, the guide portions 15 and 17 and the sliding members 138 and 139 can be surely improved in durability and so forth.

Figure 16:
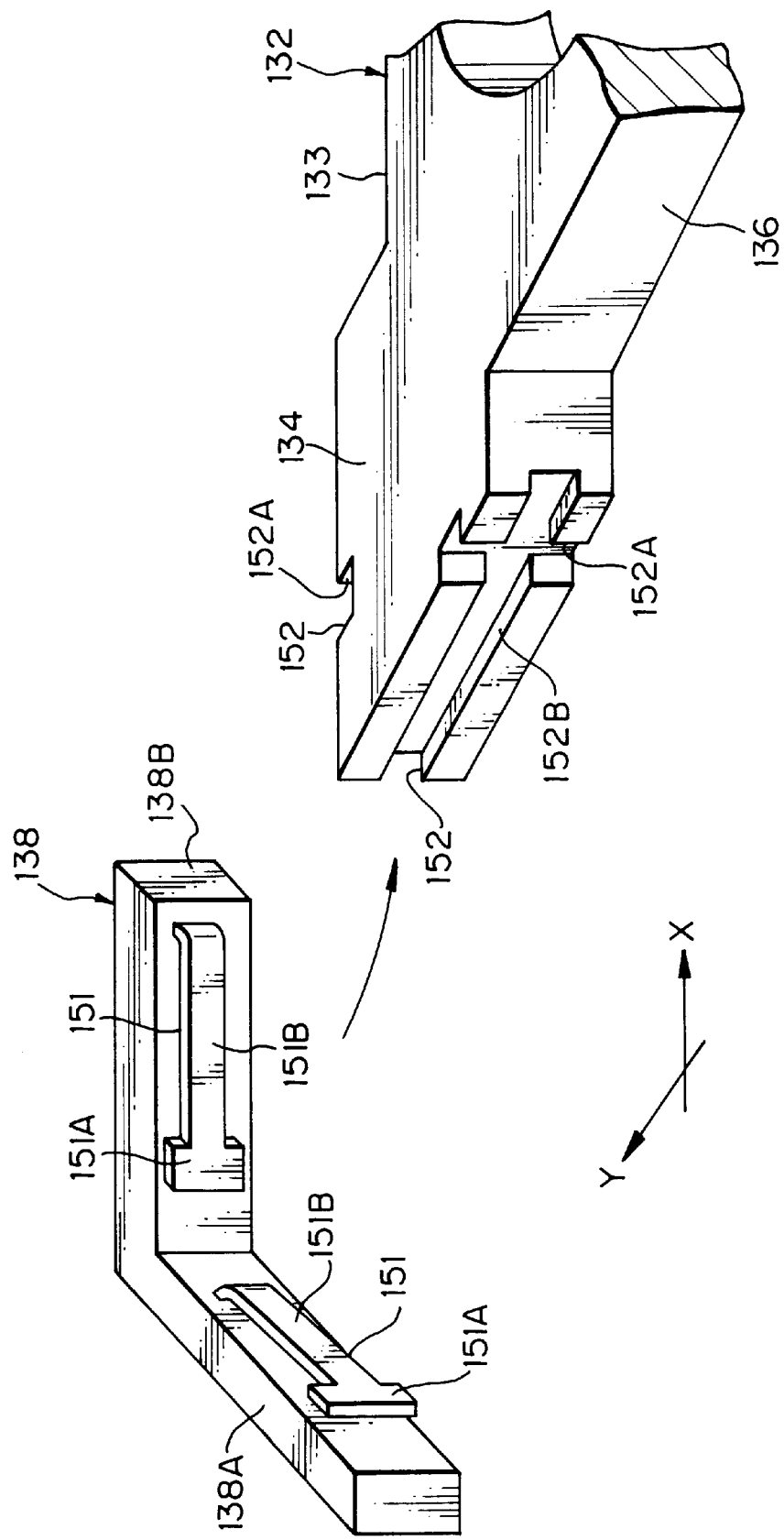
FIG. 16 is a partially-cutaway exploded perspective view showing a plate member, a sliding member, urging members, etc. of a scroll air compressor according to a thirteenth embodiment of the present invention.

FIG. 16 shows a thirteenth embodiment of the present invention. In this embodiment, the same constituent elements as those in the twelfth embodiment are denoted by the same reference characters, and a description thereof is omitted. The feature of this embodiment resides in that each sliding member 138 is integrally provided with urging portions 151 as resilient members in place of the urging portions 140, and engagement grooves 152 are provided in outer side surfaces of each slider 134, thereby mounting each sliding member 138 on the plate member 133 of the movable plate 32 through the urging portions 151 and the engagement grooves 152.

The urging portions 151 are approximately similar in structure to the urging portions 140. Each urging portion 151 is formed from an engagement portion 151A and a pressing plate portion 151B as a flat plate member having a T-shaped configuration as a whole.

Each engagement groove 152 is formed as a cross-shaped groove in an outer side surface of the slider 134 from a relatively short groove portion 152A and a relatively long groove portion 152B so that the overall configuration of the engagement groove 152 corresponds to that of the urging portion 151. The engagement portion 151A and at least the distal end of the pressing plate portion 151B of each urging portion 151 are engaged with the groove portions 152A and 152B, respectively, of the engagement groove 152, thereby allowing each sliding member 138 to be mounted on the plate member 133 in a properly positioned state.

With this embodiment also, it is possible to obtain advantageous effects approximately similar to those in the twelfth embodiment.

Figure 17:
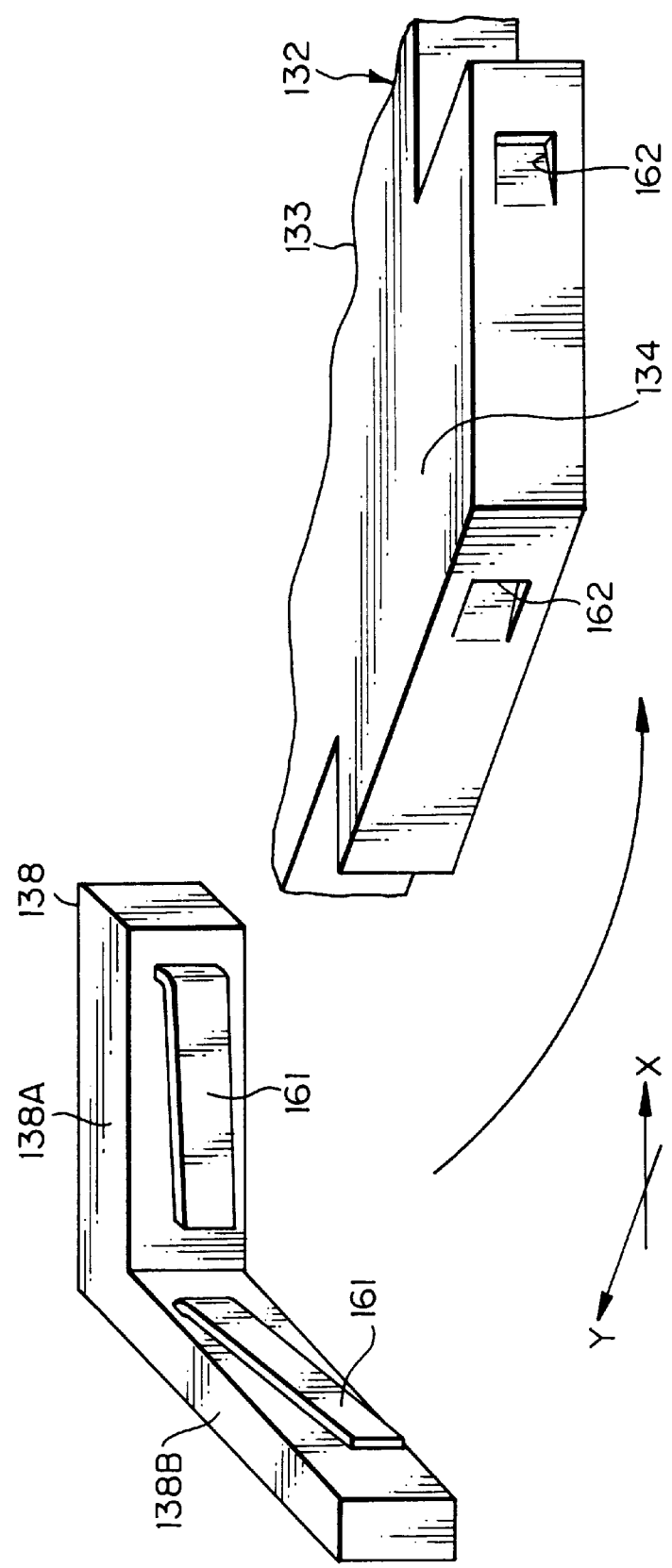
FIG. 17 is a perspective view similar to FIG. 16, showing a plate member, a sliding member, urging members, etc. of a scroll air compressor according to a fourteenth embodiment of the present invention.

FIG. 17 shows a fourteenth embodiment of the present invention. In this embodiment, the same constituent elements as those in the twelfth embodiment are denoted by the same reference characters, and a description thereof is omitted. The feature of this embodiment resides in that urging portions 161 are integrally provided on each sliding member 138 in place of the urging portions 140 described in the twelfth embodiment, and grooves 162 are provided in outer side surfaces of each slider 133, thereby mounting the sliding member 138 on the plate member 133 of the movable plate 132 through the urging portions 161 and the grooves 162.

The urging portions 161 are formed from approximately rectangular flat plate materials which are elongated in the X- and Y-axis directions, respectively, in substantially the same way as in the case of the pressing plate portions 151B described in the thirteenth embodiment. Each groove 162 is formed in an outer side surface of the plate member 133 as a groove having an approximately triangular longitudinal section. Each sliding member 138 is mounted on the movable plate 132 in a properly positioned state by engaging the distal ends of the urging portions 161 into the grooves 162, respectively.

With this embodiment also, it is possible to obtain advantageous effects approximately similar to those in the twelfth embodiment.

Figure 18:
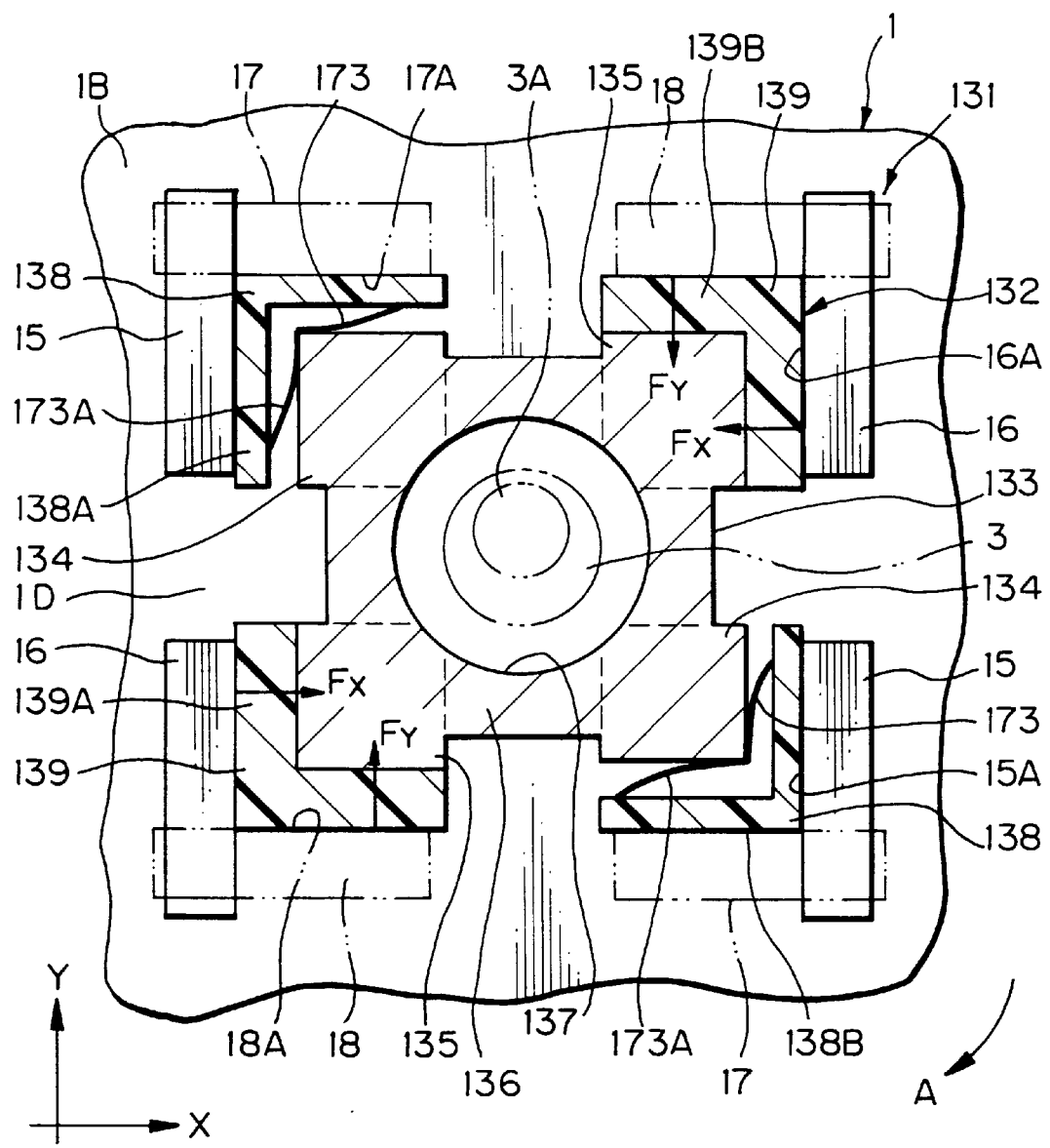
FIG. 18 is a sectional view similar to FIG. 2, showing a movable plate, guide portions, urging members, etc. of a scroll air compressor according to a fifteenth embodiment of the present invention.
Figure 19:
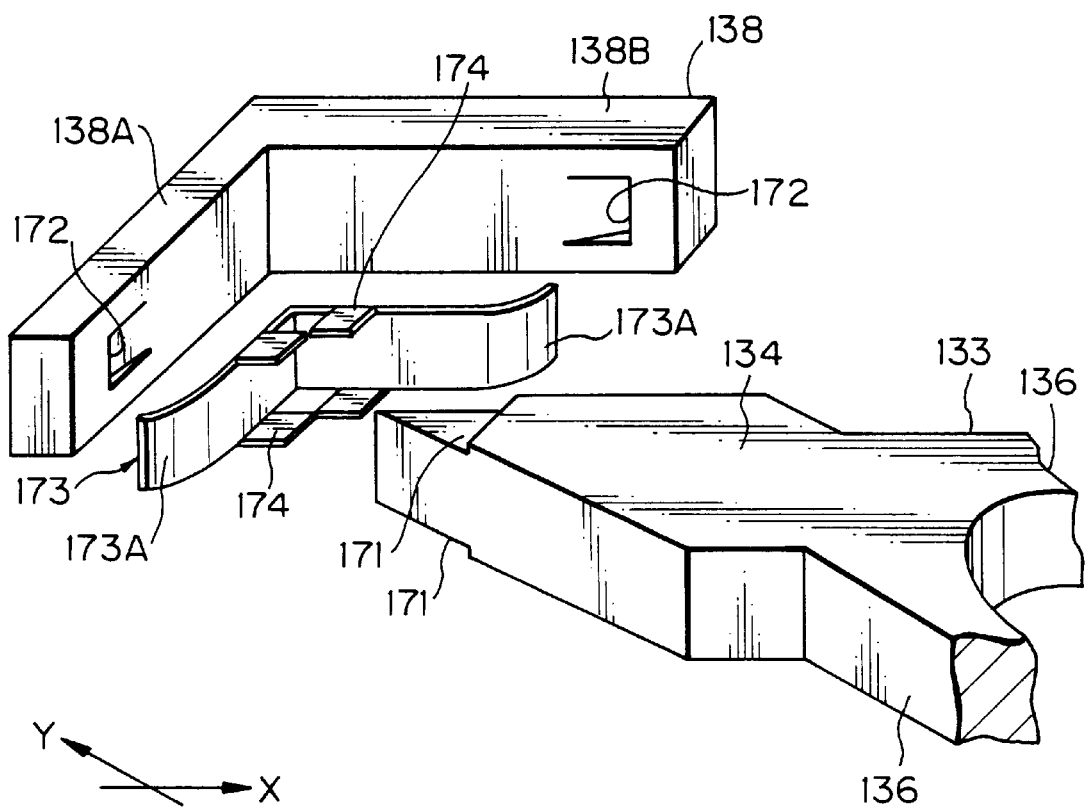
FIG. 19 is an enlarged exploded perspective view showing a plate member, a sliding member, an urging member, etc.

FIGS. 18 and 19 show a fifteenth embodiment of the present invention. In this embodiment, the same constituent elements as those in the twelfth embodiment are denoted by the same reference characters, and a description thereof is omitted. The feature of this embodiment resides in that engagement surfaces 171 are provided on each slider 134 of the movable plate 132, and grooves 172 are provided in each sliding member 138, and that an urging member 173 as a resilient member is provided separately from the slider 134 and the sliding member 138.

As shown in FIG. 19, the engagement surfaces 171 are formed on the upper and lower surfaces of the slider 134 at a corner thereof as step surfaces, respectively. The grooves 172 are, as shown in FIG. 19, formed in the respective inner side surfaces of the sliding plate portions 138A and 138B of the sliding member 138 as in the case of the grooves 162 described in the fourteenth embodiment.

As shown in FIG. 19, the urging member 173 is formed by bending an approximately rectangular metal plate into an approximately L-shaped configuration. The urging member 173 has a pair of urging plate portions 173A. Each urging plate portion 173A has engagement plate portions 174 projecting in an approximately L-like shape from both the lateral ends thereof, respectively.

The distal ends of the urging plate portions 173A of the urging member 173 are engaged in the grooves 172, respectively, and the engagement plate portions 174 are engaged with the engagement surfaces 171, respectively, thereby mounting the sliding member 138 on the plate member 133 through the urging member 173 in a properly positioned state.

As shown in FIG. 18, the urging members 173 are disposed in the state of being deflected between the associated sliders 134 and sliding members 138, thus causing the sliding plate portions 139A and 139B of the sliding members 139 to be resiliently pressed against the respective sliding surfaces 16A and 18A of the guide portions 16 and 18 against the loads applied in the directions of the arrows FX and FY by the rotational torque from the orbiting scroll member 4.

With this embodiment also, it is possible to obtain advantageous effects approximately similar to those in the twelfth embodiment. In particular, according to this embodiment, the urging members 173 are provided separately from the sliding members 138; therefore, the urging members 173 can be formed by using a metallic material of excellent durability, and the overall lifetime of the rotation preventing mechanism 131 can be surely increased. Moreover, because each urging member 173 is integrally provided with a pair of urging plate portions 173A, the number of parts constituting the urging member 173 can be reduced.

Figure 20:
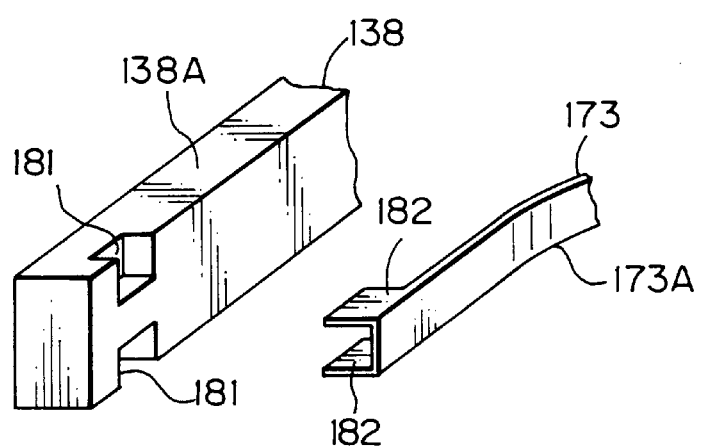
FIG. 20 is a fragmentary perspective view showing a sliding member and an urging member of a scroll air compressor according to a sixteenth embodiment of the present invention.

FIG. 20 shows a sixteenth embodiment of the present invention. In this embodiment, the same constituent elements as those in the fifteenth embodiment are denoted by the same reference characters, and a description thereof is omitted. The feature of this embodiment resides in that a pair of grooves 181 are provided in each sliding member 138 in place of each groove 172, and engagement plate portions 182 are integrally provided on each urging plate portions 173A of each urging member 173, thereby mounting the urging member 173 on the sliding member 138 through the engagement between the grooves 181 and the engagement plate portions 182.

The grooves 181 are vertically spaced apart from each other on the inner side surface of each sliding member 138. The engagement plate portions 182 are formed as in the case of the engagement plate portions 174 described in the sixteenth embodiment. More specifically, the engagement plate portions 182 are bent to project in an approximately L-like shape from both the upper and lower edges of the distal end of each urging plate portion 173A. The urging member 173 is mounted on the sliding member 138 in a properly positioned state by engaging the engagement plate portions 182 with the grooves 181.

With this embodiment also, it is possible to obtain advantageous effects approximately similar to those in the fifteenth embodiment.

Figure 21:
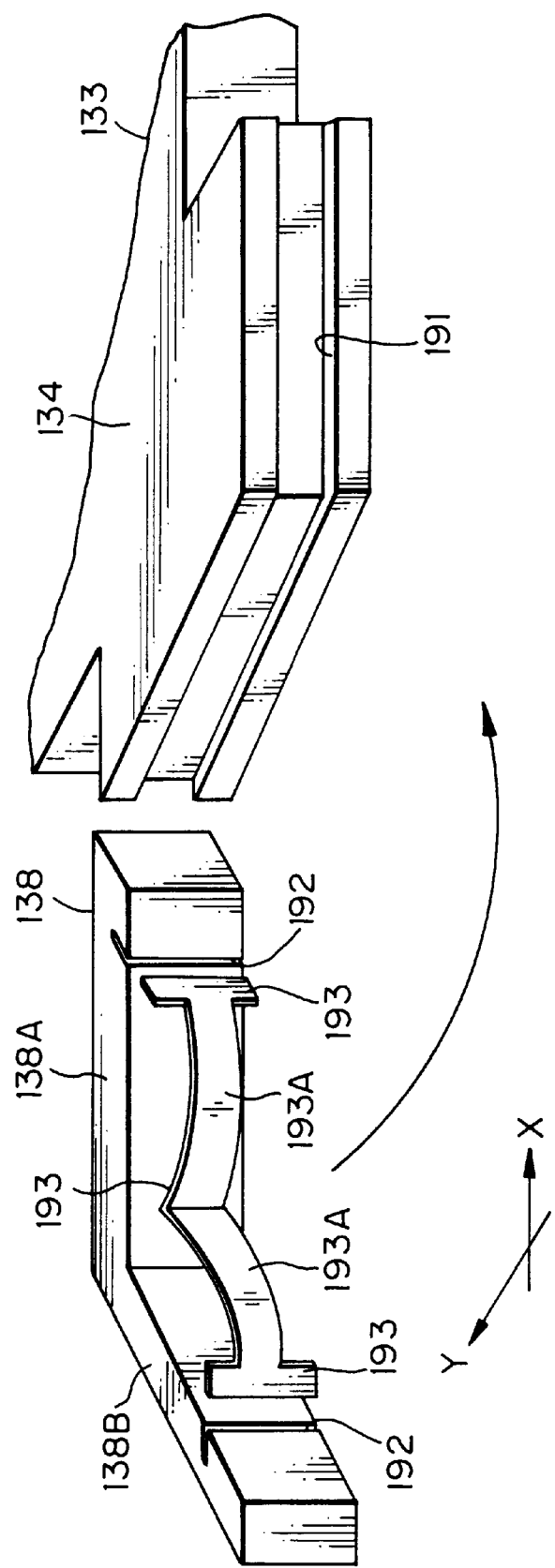
FIG. 21 is an exploded perspective view showing a movable plate, a sliding member, an urging member, etc. of a scroll air compressor according to a seventeenth embodiment of the present invention.

FIG. 21 shows a seventeenth embodiment of the present invention. In this embodiment, the same constituent elements as those in the fifteenth embodiment are denoted by the same reference characters, and a description thereof is omitted. The feature of this embodiment resides in that engagement grooves 191 are provided in outer side surfaces of each slider 134 in place of the engagement surfaces 171 described in the fifteenth embodiment, and the sliding plate portions 138A and 138B of each sliding member 138 are provided with a pair of grooves 192 in place of the grooves 172 described in the fifteenth embodiment, thereby providing the sliding members 138 on the plate member 133 through an urging member 193.

The engagement grooves 191 extend longitudinally along the outer side surfaces of the slider 134 such that the groove width corresponds to the plate width of urging plate portions 193A of the urging member 193. The grooves 192 are formed in the inner side surfaces of the sliding member 138 as in the case of the grooves 31 described in the second embodiment. The urging member 193 is formed as in the case of the urging member 173 described in the fifteenth embodiment. The urging member 193 has a pair of urging plate portions 193A. The distal ends of the urging plate portions 193A extend in a T-shape and are inserted into the grooves 192, respectively. The urging plate portions 193A of the urging member 193 are resiliently engaged in the engagement grooves 191 (i.e. the urging plate portions 193A resiliently abut on the bottoms of the grooves 191), respectively, thereby enabling the sliding member 138 to be mounted on the plate member 133 in a properly positioned state.

With this embodiment also, it is possible to obtain advantageous effects approximately similar to those in the fifteenth embodiment.

Figure 22:
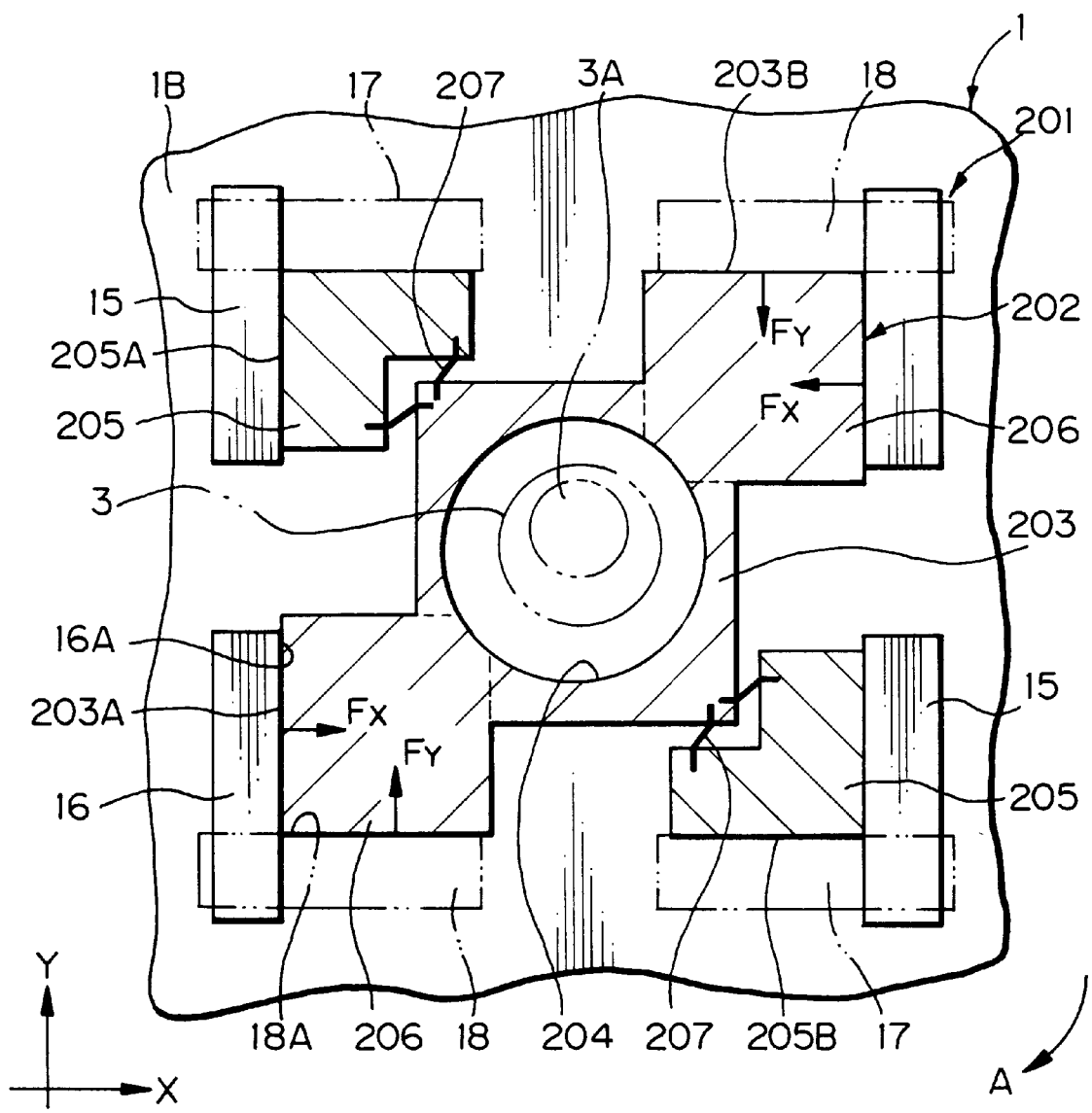
FIG. 22 is a sectional view similar to FIG. 2, showing a movable plate, guide portions, urging members, etc. of a scroll air compressor according to an eighteenth embodiment of the present invention.
Figure 23:
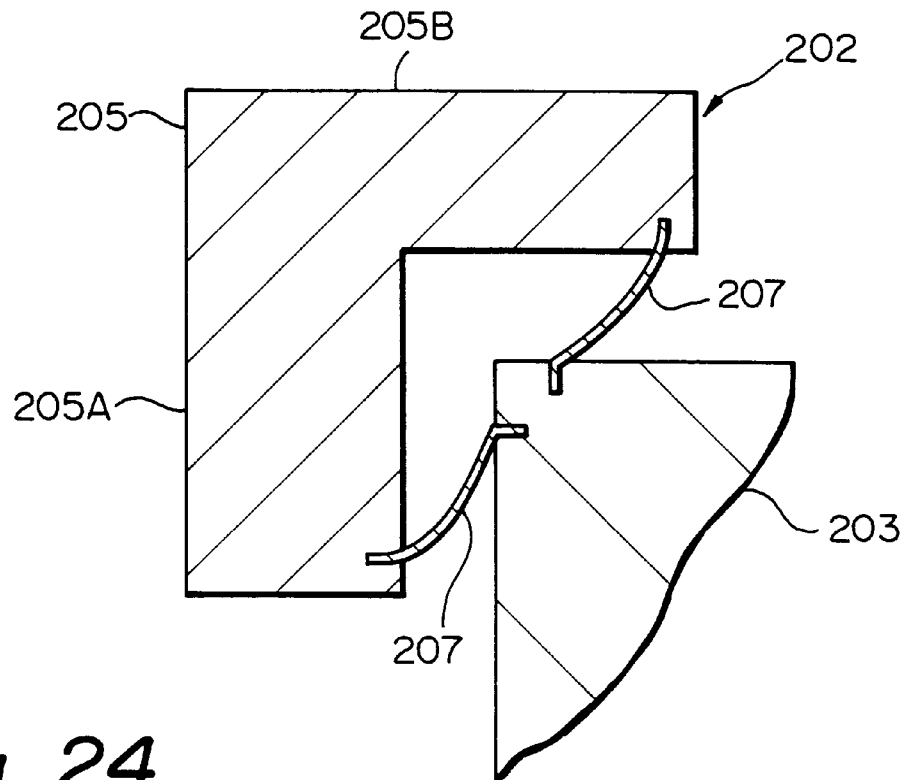
FIG. 23 is a fragmentary enlarged sectional view showing a plate member, a slider portion and urging members in FIG. 22.

FIGS. 22 and 23 show an eighteenth embodiment of the present invention. In this embodiment, the same constituent elements as those in the fifteenth embodiment are denoted by the same reference characters, and a description thereof is omitted. The feature of this embodiment resides in that a rotation preventing mechanism 201 comprises guide portions 15, 16, 17 and 18 and a movable plate 202 as a movable joint, and that the movable plate 202 comprises a plate member 203 as a movable joint body having a clearance hole 204, and slider portions 205 and 206 as sliding portions, and further that each slider portion 205 is attached to the plate member 203 through a pair of urging members 207 as resilient members, whereas each slider portion 206 is integrally formed on the plate member 203.

The movable plate 202 is formed from a plate member 203 and slider portions 205 and 206 such that the overall configuration of the movable plate 202 is approximately similar to that of the plate member 133 described in the fifteenth embodiment. The plate member 203 is formed in the shape of an approximately square flat plate and has a clearance hole 204 formed in the center thereof. Each slider portion 205 is formed in a shape approximately similar to that of each sliding member 139 described in the fifteenth embodiment, and has a Y-axis sliding surface 205A and an X-axis sliding surface 205B. The slider portions 206 are formed in substantially the same way as in the case of the sliders 135 described in the fifteenth embodiment. Each slider portion 206 has a Y-axis sliding surface 206A and an X-axis sliding surface 206B.

The urging members 207 are formed from metal plates or the like in substantially the same way as in the case of the urging portions 140 described in the twelfth embodiment. The urging members 207 are disposed in the state of being deflected between the plate member 203 and the associated slider portions 205. The urging members 207 cause the sliding surfaces 206A and 206B of each slider portion 206 to be resiliently pressed against the sliding surfaces 16A and 18A of the guide portions 16 and 18 against the loads applied in the directions of the arrows FX and FY by the rotational torque from the orbiting scroll member 4.

With this embodiment also, it is possible to obtain advantageous effects approximately similar to those in the fifteenth embodiment.

Figure 24:
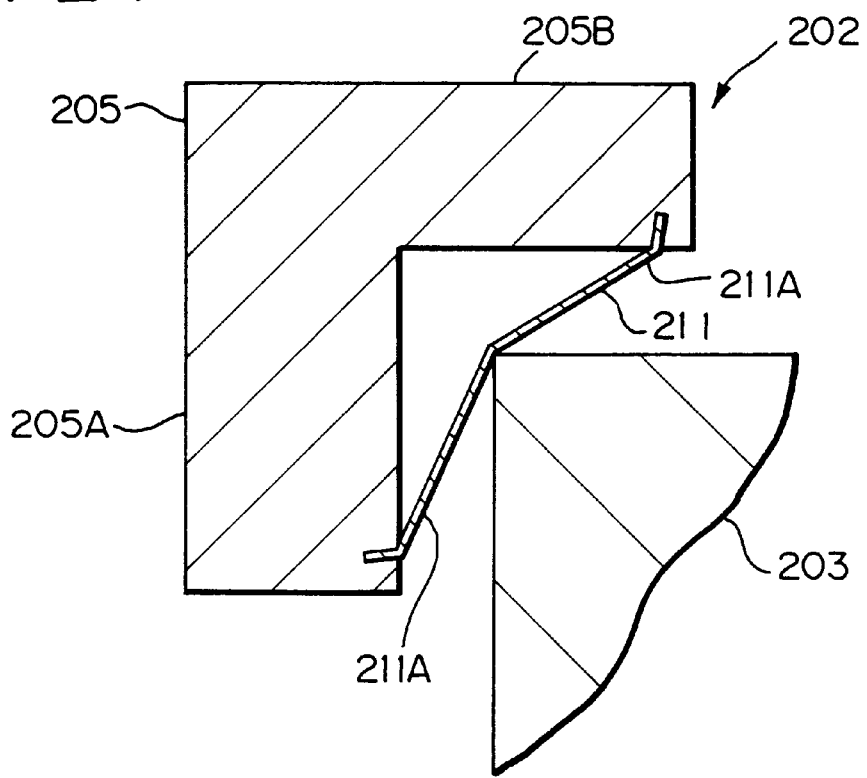
FIG. 24 is an enlarged sectional view similar to FIG. 23, showing a plate member, a slider portion and urging members of a scroll air compressor according to a nineteenth embodiment of the present invention.

FIG. 24 shows a nineteenth embodiment of the present invention. In this embodiment, the same constituent elements as those in the eighteenth embodiment are denoted by the same reference characters, and a description thereof is omitted. The feature of this embodiment resides in that an urging member 211 as a resilient member is provided between the plate member 203 and each slider portion 205 of the movable plate 202 in place of the pair of urging members 207 described in the eighteenth embodiment.

The urging member 211 is formed from a pair of urging plate portions 211A in substantially the same way as in the case of the urging member 193 described in the seventeenth embodiment. The urging member 211 is integrally mounted on the inner side surfaces of the slider portion 205. The urging member 211 has a corner portion between the urging plate portions 211A. The corner portion resiliently abuts on a corner of the plate member 203. The arrangement may be such that the outer side surfaces of the plate member 203 are provided with engagement grooves similar to the engagement grooves 191 described in the seventeenth embodiment, and the urging member 211 is engaged in the engagement grooves.

With this embodiment also, it is possible to obtain advantageous effects approximately similar to those in the fifteenth embodiment.

Figure 25:
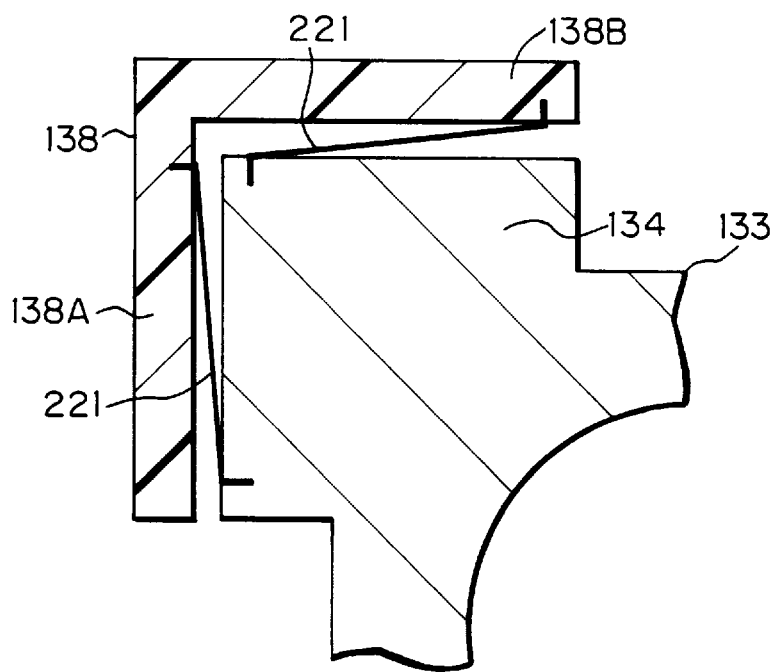
FIG. 25 is a sectional view similar to FIG. 23, showing a plate member, a slider portion and urging members of a scroll air compressor according to a twentieth embodiment of the present invention.

FIG. 25 shows a twentieth embodiment of the present invention. In this embodiment, the same constituent elements as those in the fifteenth embodiment, shown in FIGS. 18 and 19, are denoted by the same reference characters, and a description thereof is omitted. The feature of this embodiment resides in that a pair of urging members 221 as resilient members are integrally provided between each sliding member 138 and the associated slider 134 of the plate member 133 in place of the urging member 173.

Each urging member 221 is formed from a metal plate or the like in substantially the same way as in the case of the urging members 207 described in the eighteenth embodiment.

With this embodiment also, it is possible to obtain advantageous effects approximately similar to those in the fifteenth embodiment.

Figure 26:
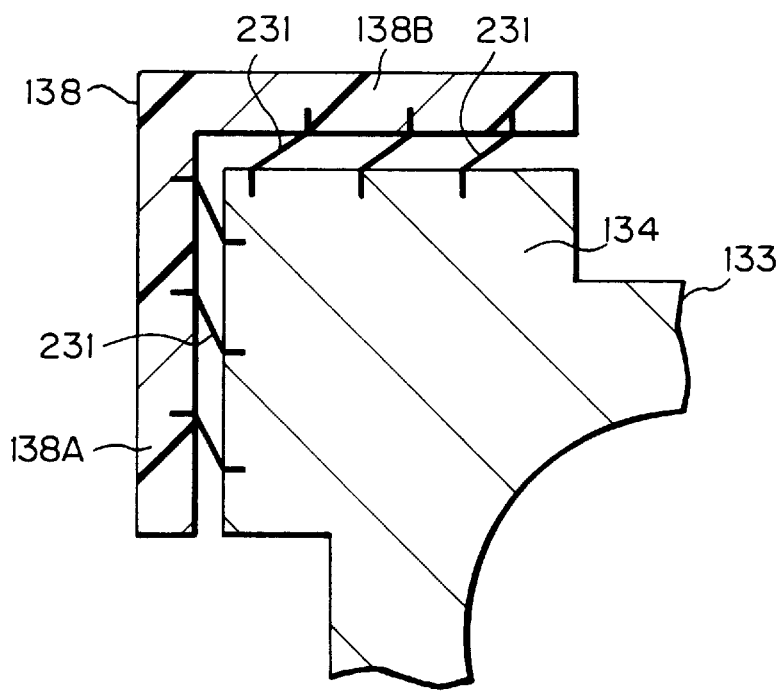
FIG. 26 is a sectional view similar to FIG. 23, showing a plate member, a sliding portion and urging members of a scroll air compressor according to a twenty-first embodiment of the present invention.

FIG. 26 shows a twenty-first embodiment of the present invention. In this embodiment, the same constituent elements as those in the fifteenth embodiment, shown in FIGS. 18 and 19, are denoted by the same reference characters, and a description thereof is omitted. The feature of this embodiment resides in that a plurality of urging members 231 as resilient members are integrally provided between each sliding member 138 and the associated slider 134 of the plate member 133 in place of the pair of urging member 221 described in the twentieth embodiment.

Each urging member 231 is formed such that the overall configuration is smaller in size than each urging member 221.

With this embodiment also, it is possible to obtain advantageous effects approximately similar to those in the fifteenth embodiment.

FIGS. 27 through 32 show a twenty-second embodiment of the present invention. The feature of this embodiment resides in that one end of a plate spring as a resilient member is fixed to a Y-axis guide portion as a joint guide, while the other end of the plate spring is formed as a free end, and that a longitudinally intermediate portion of the plate spring resiliently abuts on a movable plate as a movable joint. It should be noted that in this embodiment, the same constituent elements as those in the first embodiment are denoted by the same reference characters, and a description thereof is omitted.

Figure 27:
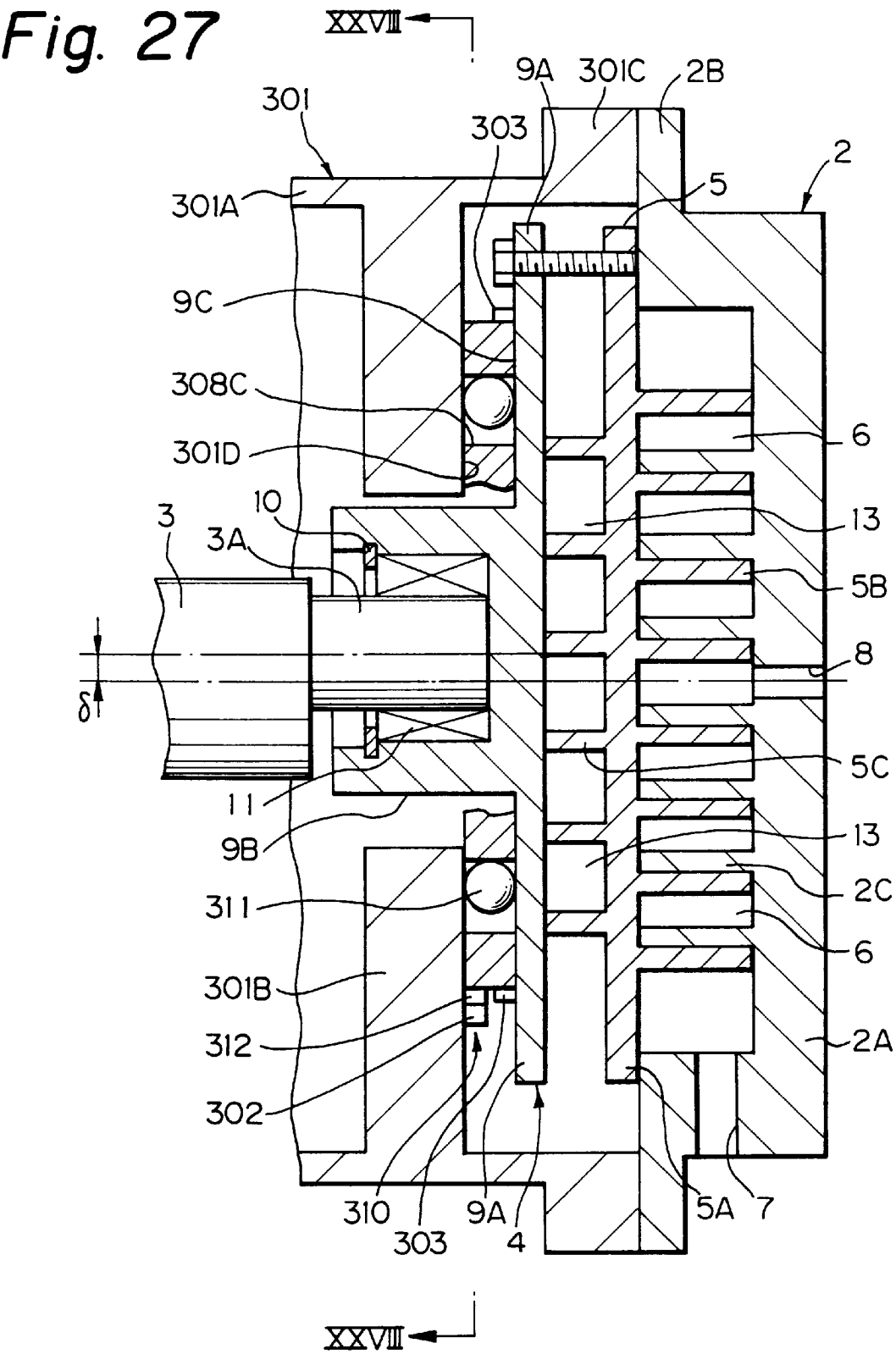
FIG. 27 is a longitudinal sectional view of a scroll air compressor according to a twenty-second embodiment of the present invention.
Figure 28:
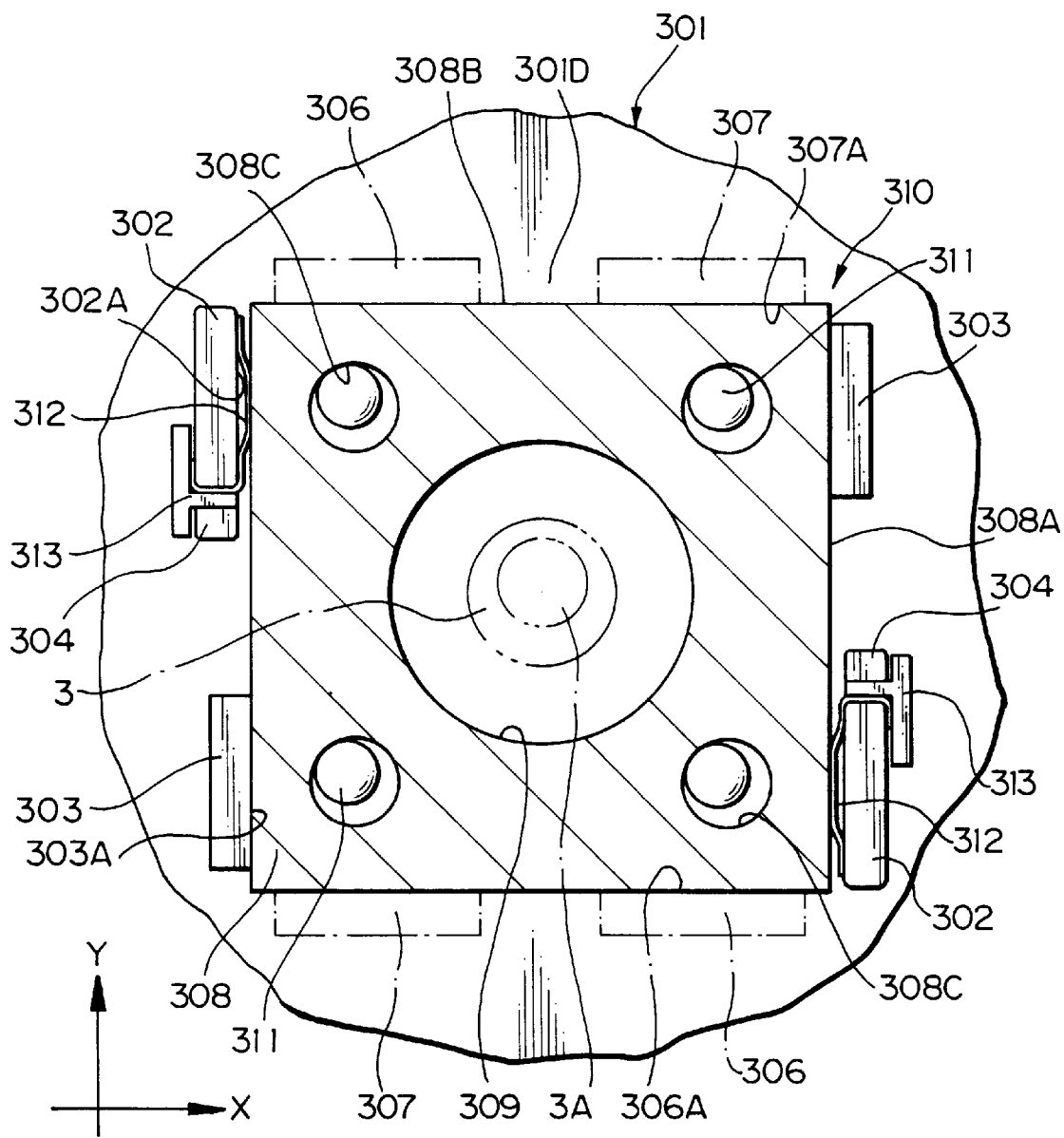
FIG. 28 is an enlarged sectional view as seen in the direction of the arrow XXVIII—XXVIII in FIG. 27, showing guide portions provided on a casing, a movable plate, and so forth.

A casing 301 used in this embodiment is arranged in substantially the same way as in the case of the casing 1 described in the first embodiment. The casing 301 has a casing body 301A, a thrust bearing portion 301B, and a butt portion 301C. As shown in FIG. 27, the thrust bearing portion 301B of the casing 301 has an inner diameter smaller than that of the thrust bearing portion 1B in the first embodiment. Of the two end surfaces of the thrust bearing portion 301B, the fixed scroll member-side end surface serves as a sliding surface 301D for a movable plate 308 (described later).

A pair of Y-axis guide portions 302 are integrally provided on the sliding surface 301D. The Y-axis guide portions 302, together with another pair of Y-axis guide portions 303 (described later), constitute a first joint guide having a total of four guide portions. Each Y-axis guide portion 302 is formed in substantially the same way as in the case of the Y-axis guide portions 15 described in the first embodiment, and has an inner side surface 302A. The Y-axis guide portions 303 are integrally provided on the sliding surface 301D of the casing 301 as in the case of the Y-axis guide portions 302. Each Y-axis guide portion 303 is formed in substantially the same way as in the case of the Y-axis guide portions 16 described in the first embodiment, and has a sliding surface 303A for the movable plate 308.

Of the Y-axis guide portions 302 and 303, each Y-axis guide portion 302 constitutes a guide portion on a non-loading side where the effect of the load due to the rotational torque from the orbiting scroll member 4 is small, and each Y-axis guide portion 303 constitutes a guide portion on a loading side where the effect of the load is large.

However, of the Y-axis guide portions 302 and 303, the Y-axis guide portions 302 differ from those in the first embodiment in that, as shown in FIG. 27, the Y-axis guide portions 302 are disposed at respective positions slightly outward in the X-axis direction relative to the Y-axis guide portions 303.

Prismatic projections 304 are integrally provided on the sliding surface 301D of the casing 301 at respective positions between the Y-axis guide portions 302 and 303. Each projection 304 is disposed to face an end surface of the associated Y-axis guide portion 302 in the Y-axis direction across a slight gap 305 for mounting a plate spring 312 through a fixing member 313 (described later).

A pair of X-axis guide portions 306 are integrally provided on the sliding surface 9C of the orbiting scroll member 4. The X-axis guide portions 306 constitute a second joint guide having a total of four guide portions in combination with another pair of X-axis guide portions 307 integrally provided on the sliding surface 9C. The X-axis guide portions 306 and 307 are formed in substantially the same way as in the case of the X-axis guide portions 18 described in the first embodiment, and have sliding surfaces 306A and 307A, respectively.

Of the X-axis guide portions 306 and 307, each X-axis guide portion 306 constitutes a guide portion on a non-loading side where the effect of the load due to the rotational torque from the orbiting scroll member 4 is small, and each X-axis guide portion 307 constitutes a guide portion on a loading side where the effect of the load is large.

The movable plate 308, which is used as a movable joint in this embodiment, is formed into an approximately square flat plate with a uniform plate thickness by using a material substantially similar to that of the movable plate 19 described in the first embodiment. The movable plate 308 has a clearance hole 309 provided in the center thereof. Outer side surfaces of the movable plate 308 that extend in the Y-axis direction serve as sliding surfaces 308A for the plate springs 312 (described later) and the Y-axis guide portions 303. Outer side surfaces of the movable plate 308 that extend in the X-axis direction serve as sliding surfaces 308B for the X-axis guide portions 307.

Four through-holes 308C are formed in four corners of the movable plate 308 in parallel to the driving shaft 3. The movable plate 308 constitutes a rotation preventing mechanism 310 in combination with the Y-axis guide portions 302 and 303 and the X-axis guide portions 306 and 307.

Spheres 311 are inserted into the through-holes 308C, respectively, of the movable plate 308. The spheres 311 are formed as spherical balls from a metallic material which is harder than the movable plate 308. The diameter of each sphere 311 is slightly larger than the axial dimension of each through-hole 308C. The spheres 311 rollably contact the sliding surface 301D of the casing 301 and the sliding surface 9C of the orbiting scroll member 4, thereby preventing the movable plate 308 from coming in direct sliding contact with the sliding surface 9C or 301D. In addition, when the movable plate 308 is guided by the guide portions 302, 303, 306 and 307, the spheres 311 roll between the casing 301 and the orbiting scroll member 4 in response to the movement of the movable plate 308, and while doing so, the spheres 311 bear a thrust load applied from the orbiting scroll member 4.

Figure 29:
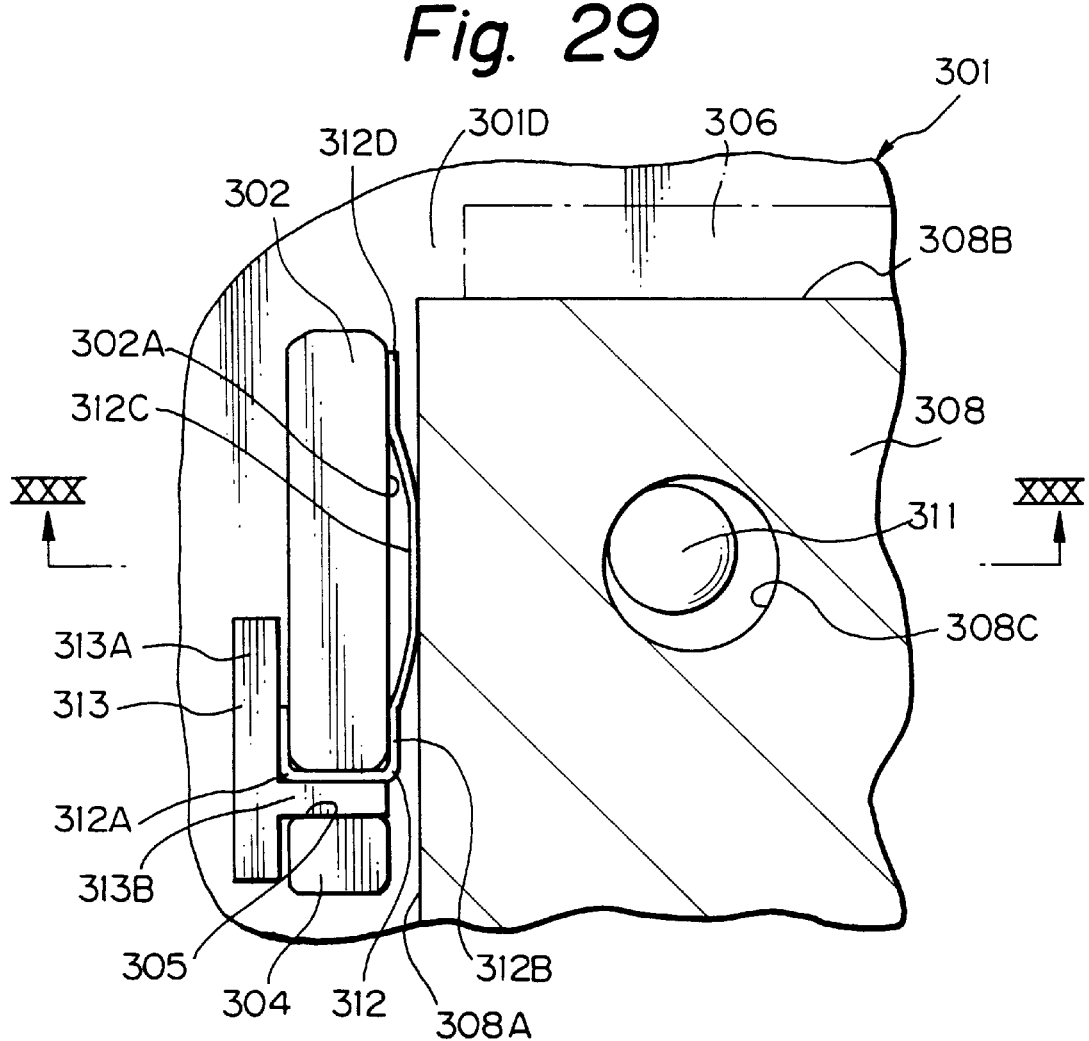
FIG. 29 is a fragmentary enlarged view of an essential part of the arrangement shown in FIG. 28.
Figure 30:
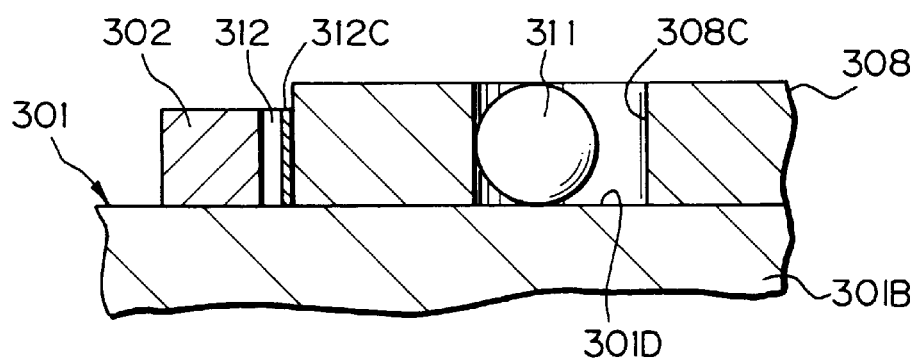
FIG. 30 is a sectional view as seen in the direction of the arrow XXX—XXX in FIG. 29.
Figure 31:
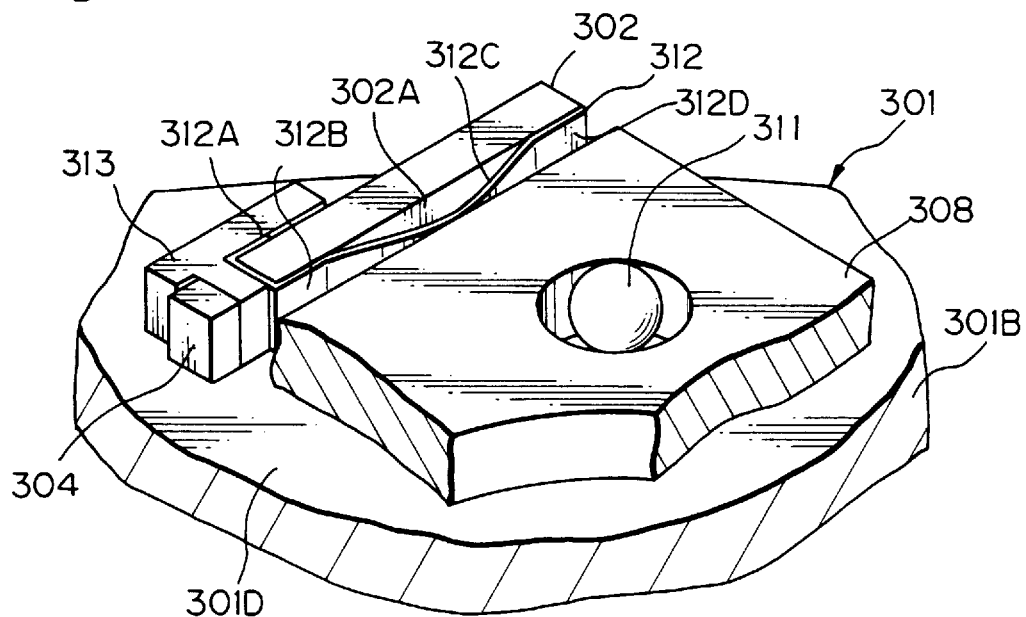
FIG. 31 is a partially-cutaway enlarged perspective view showing a Y-axis guide portion, a movable plate, a plate spring, etc.

The pair of plate springs 312, which serve as resilient members fitted on the guide portion 302, respectively, are formed as shown in FIG. 29 by pressing a metal plate or the like having spring properties. The plate thickness of each plate spring 312 is slightly greater than that of the plate spring 24 according to the first embodiment.

As shown in FIGS. 29 through 32, each plate spring 312 has a bent plate portion 312A located on one longitudinal end of the associated Y-axis guide portion 302 and extending between the Y-axis guide portion 302 and the associated fixing member 313 in an approximately L-shaped configuration. A flat plate portion 312B has a proximal end portion bent in an approximately L-shaped configuration from the distal end of the bent plate portion 312A and extends straight toward the other longitudinal end of the Y-axis guide portion 302 such that the distal end of the flat plate portion 312B abuts on the inner side surface 302A. A curved plate portion 312C extends in an approximately convex curve shape between the flat plate portion 312B and an extended plate portion 312D which is located at the other end of the Y-axis guide portion 302. The extended plate portion 312D extends from the end of the curved plate portion 312C in an approximately V-like shape such that the distal end portion of the extended plate portion 312D extends straight as in the case of the flat plate portion 312B so as to abut on (i.e. slidingly contact) the inner side surface 302A.

The bent plate portion 312A at one end of the plate spring 312 is secured to the Y-axis guide portion 302 through the fixing member 313. The curved plate portion 312C as a longitudinally intermediate portion of the plate spring 312 is resiliently pressed to abut on (i.e. slidingly contact) the sliding surface 308A of the movable plate 308. The extended plate portion 312D at the other end of the plate spring 312 forms a free end that is slidingly displaced along the Y-axis direction relative to the inner side surface 302A of the Y-axis guide portion 302 in response to the elastic deformation of the plate spring 312.

Figure 32:
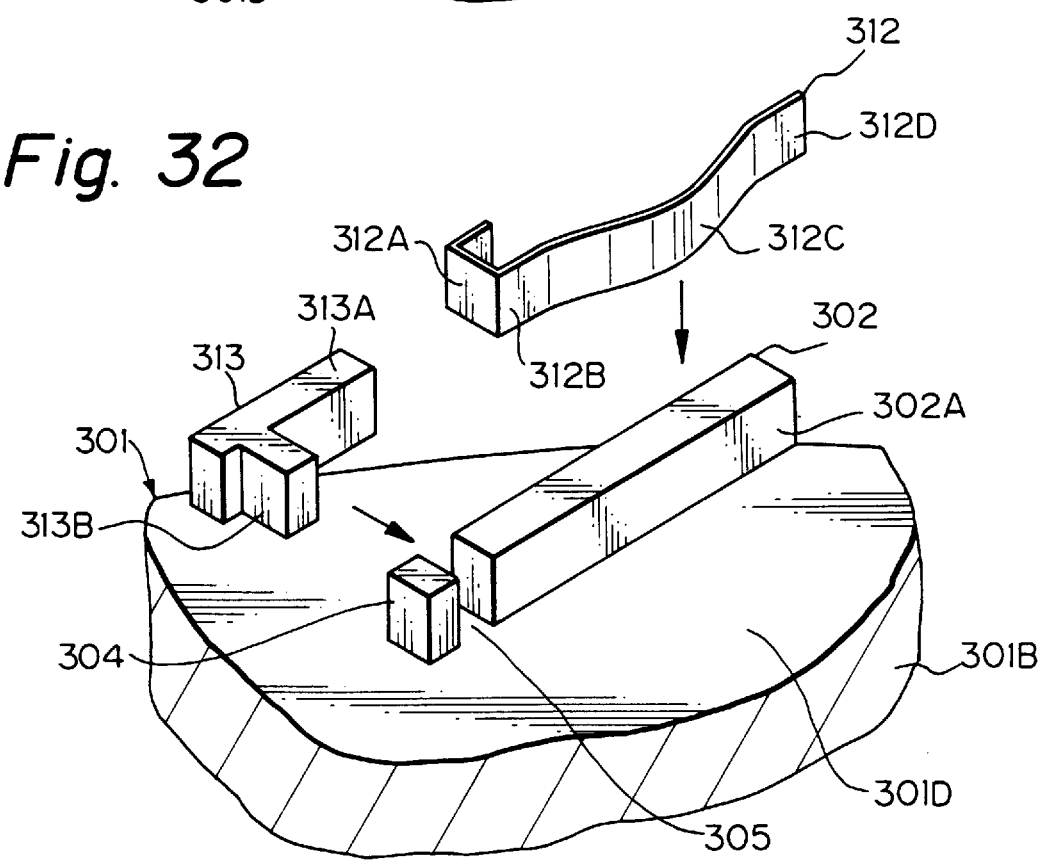
FIG. 32 is an exploded perspective view showing the Y-axis guide plate, the plate spring, etc.

As shown in FIGS. 29 and 32, the fixing members 313 for securing the plate springs 312 to the Y-axis guide portions 302, respectively, are formed as square plate members each having an approximately T-shaped configuration as a whole from a resin material or the like. Each fixing member 313 has a long plate portion 313A extending in the Y-axis direction and a short plate portion 313B projecting in the X-axis direction from an intermediate portion of the long plate portion 313A. The fixing member 313 has the short plate portion 313B inserted into the gap 305, thereby clamping the bent plate portion 312A of the plate spring 312 between the fixing member 313 and the Y-axis guide portion 302 such that the plate spring 312 is prevented from coming off the guide portion 302.

With this embodiment also, it is possible to obtain advantageous effects approximately similar to those in the first embodiment. In particular, according to this embodiment, the whole plate spring 312 is supported by the associated Y-axis guide portion 302 in a cantilever fashion through the fixing member 313. Therefore, the extended plate portion 312D of the plate spring 312 is allowed to slide along the Y-axis guide portion 302 without being locked to the Y-axis guide portion 302. Thus, the spring constant of the plate spring 312 can be prevented from becoming larger than necessary in comparison to a case where both ends of each plate spring 24 (32 or 41) is secured (or restrained) to the inner side surface 15A (17A) of the guide portion 15 (17) as in the first to third embodiments.

Therefore, according to this embodiment, the spring force of each plate spring 312 for pressing the movable plate 308 toward the associated Y-axis guide portion 303 can be readily adjusted to an appropriate size, and thus the movable plate 308 can smoothly slide between the Y-axis guide portions 302 and 303. Even when the plate spring 312 has a large plate thickness, the spring constant of the plate spring 312 can be set to a small value. Therefore, increasing the plate thickness of the plate spring 312 makes it possible to improve the plate spring 312 in durability, etc. and to extend the lifetime of the apparatus.

Moreover, because the plate spring 312 is arranged such that the flat plate portion 312B and the extended plate portion 312D are in plane contact with the Y-axis guide portion 302 at all times, when the plate spring 312 presses the movable plate 308 toward the associated Y-axis guide portion 303, counterforce that the plate spring 312 receives between the movable plate 308 and the Y-axis guide portion 302 can be borne at two portions, i.e. the flat plate portion 312B and the extended plate portion 312D. Thus, it is possible to prevent concentration of load on only either of the flat plate portion 312B and the extended plate portion 312D. This also makes it possible to improve the plate spring 312 in durability and to extend the lifetime of the apparatus.

FIGS. 33 through 37 show a twenty-third embodiment of the present invention. In this embodiment, the same constituent elements as those in the twenty-second embodiment are denoted by the same reference characters, and a description thereof is omitted. The feature of this embodiment resides in that each plate spring 321 as a resilient member has a curved plate portion 321C that is integrally provided with a slant plate portion 322 as a guide piece for guiding the movable plate 308 between the Y-axis guide portions 302 and 303.

Figure 33:
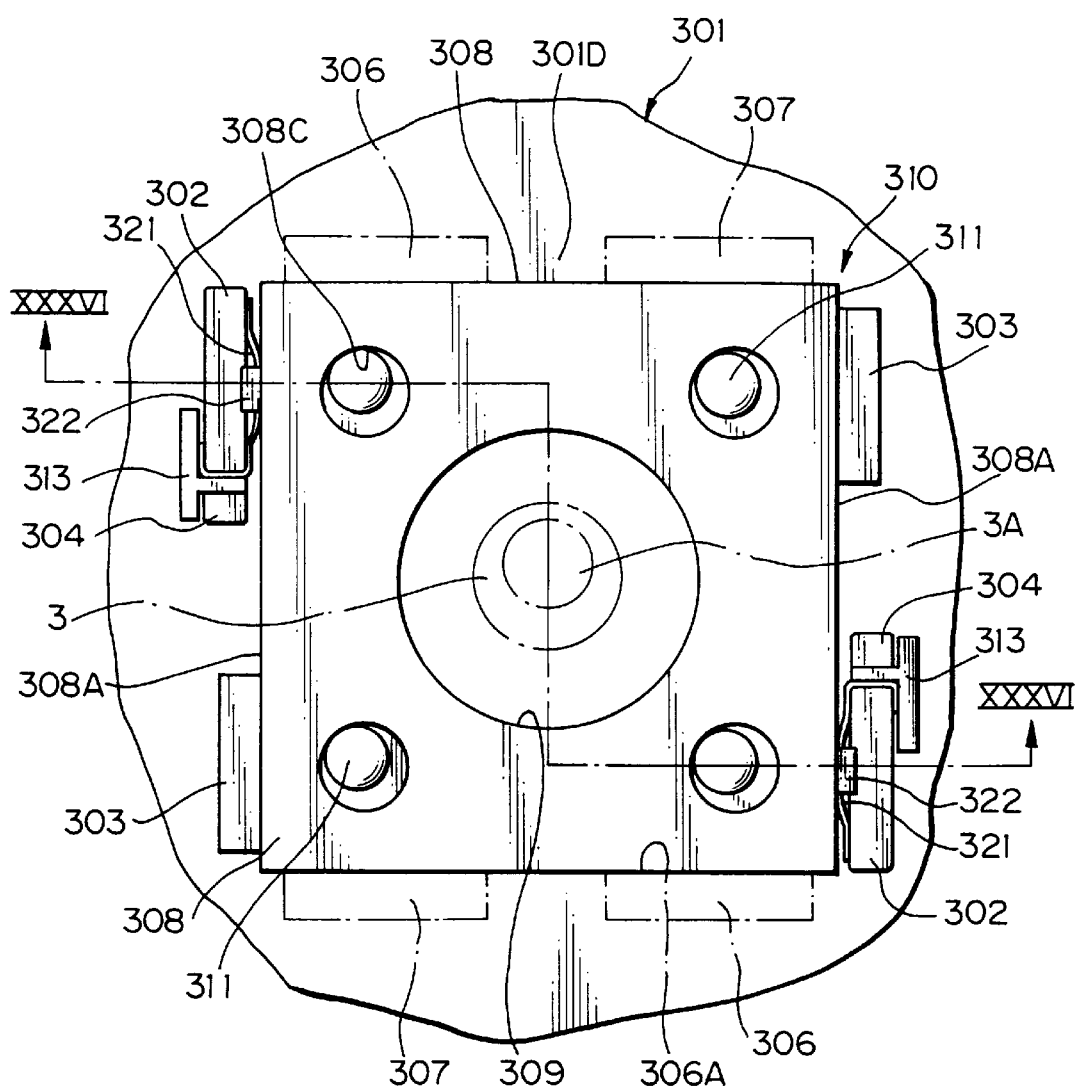
FIG. 33 is a sectional view showing guide portions provided on a casing, a movable plate, etc. according to a twenty-third embodiment of the present invention.
Figure 34:
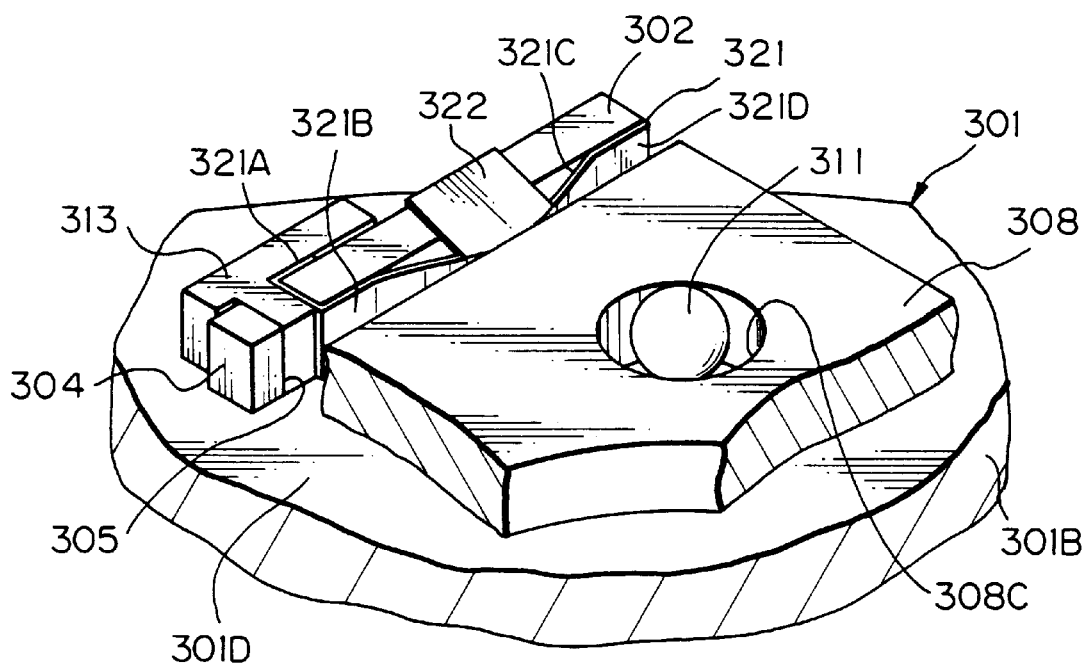
FIG. 34 is a partially-cutaway enlarged perspective view showing a Y-axis guide portion, a movable plate, a plate spring, etc.
Figure 35:
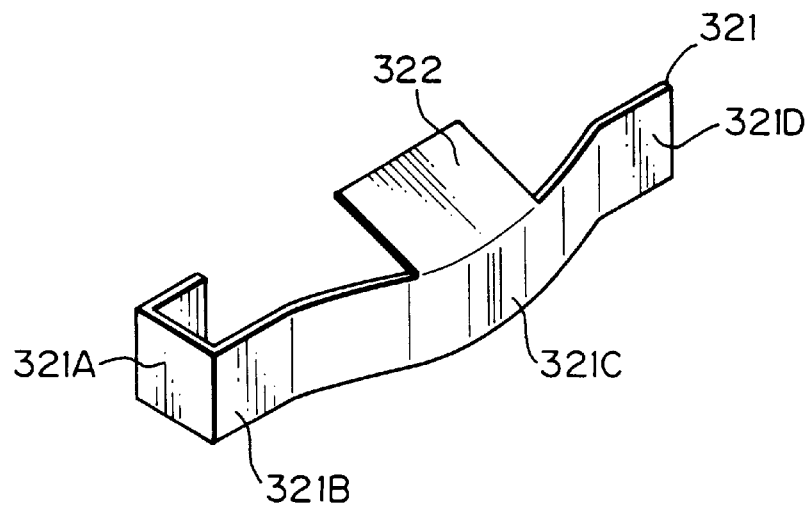
FIG. 35 is an enlarged perspective view of a plate spring in FIG. 33.

The plate spring 321 is formed in substantially the same way as in the case of the plate springs 312 described in the twenty-second embodiment. The plate spring 321 has a bent plate portion 321A, a flat plate portion 321B, a curved plate portion 321C, and an extended plate portion 321D. As shown in FIGS. 33 through 35, the curved plate portion 321C is integrally provided with a flat plate-shaped slant plate portion 322.

The slant plate portion 322 has a proximal end integrally provided on the upper end of a longitudinally intermediate portion of the curved plate portion 321C. The distal end of the slant plate portion 322 extends obliquely toward the orbiting scroll member 4 at a predetermined slant angle α (see FIG. 36) to the sliding surfaces 308A of the movable plate 308.

Figure 37:
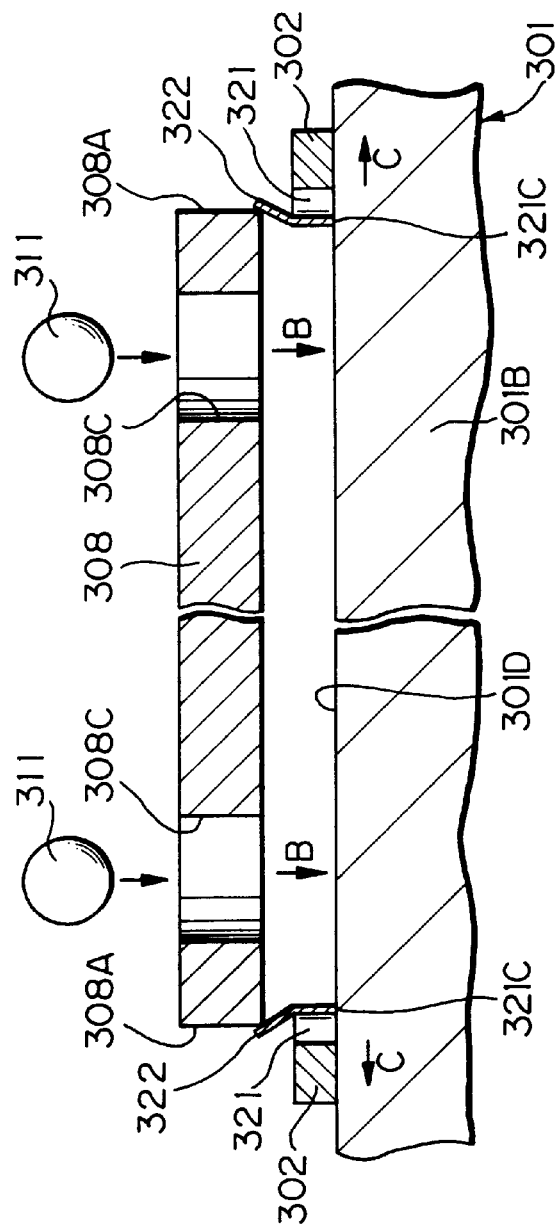
FIG. 37 is an exploded sectional view showing the movable plate and spheres in FIG. 35.

With this embodiment also, it is possible to obtain advantageous effects approximately similar to those in the twenty-second embodiment. In particular, according to this embodiment, each plate spring 321 has a slant plate portion 322 provided on the curved plate portion 321C. Therefore, in mounting of the movable plate 308, as shown in FIG. 37, the movable plate 308 is first placed above the sliding surface 301D so as to contact the distal ends of the slant plate portions 322, and in this state, it is pushed down toward the sliding surface 301D in the direction of the arrow B in FIG. 37.

Figure 36:
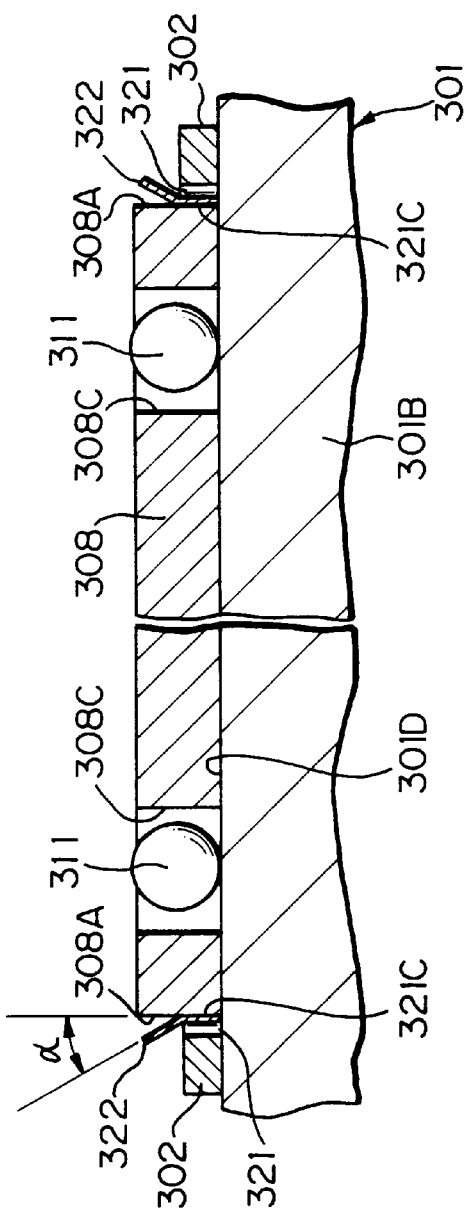
FIG. 36 is a partially-cutaway enlarged sectional view as seen in the direction of the arrow XXXVI—XXXVI in FIG. 33.

While the movable plate 308 keeps a state of being substantially parallel to the sliding surface 301D, the sliding surfaces 308A are guided downward along the slant plate portions 322. Consequently, the curved plate portions 321C of the plate springs 321 are elastically deformed outward, i.e. toward the associated Y-axis guide portions 302, causing the space between the curved plate portions 321C to enlarge in the directions of the arrows C. Accordingly, the movable plate 308 can be readily mounted between the Y-axis guide portions 302 and 303, as shown in FIG. 36.

Therefore, this embodiment makes it possible to eliminate the need of a troublesome operation to mount the movable plate 308, for example, an operation in which an operator previously presses the curved plate portion 321C of each plate spring 321 toward the associated Y-axis guide portion 302 with his/her hand. Thus, time spent in assembling the apparatus can be reduced, and the overall workability can be improved. In addition, the amount of deformation of the plate springs 321 can be minimized by mounting the movable plate 308 in a manner as described above. Thus, it is possible to avoid causing the plate springs 321 to be plastically deformed by mistake during the assembling and hence possible to stabilize the spring force of each plate spring 321. Accordingly, the rotation preventing mechanism 310 can be further improved in reliability and so forth.

Although in the twenty-second and twenty-third embodiments each plate spring 312 (321) is provided on the Y-axis guide portion 302 provided on the casing 301, it should be noted that a plate spring 312 (321) may also be provided on each X-axis guide portion 306 provided on the orbiting scroll member 4.

Although in the fifteenth embodiment the urging plate portions 173A of each urging member 173 are engaged in the grooves 172 provided in the associated sliding member 138, the arrangement may be such that the inner side surfaces of each sliding member 138 are provided with grooves similar to the grooves 192 in the seventeenth embodiment, and the urging plate portions 173A of each urging member 173 are formed into a T-shape as in the case of the urging members 193 in the seventeenth embodiment, and that the urging member 173 is secured by inserting the T-shaped urging plate portions 173A into the grooves provided in the sliding member 138.

In the twelfth to seventeenth embodiments, the plate thickness of the sliders 134 and 135 of the plate member 133 may be smaller than that of the sliding members 138 and 139.

Although in the foregoing embodiments the present invention has been described with respect to a scroll air compressor by way of example, it should be noted that the present invention is not necessarily limited thereto, but may be applied to compressors that compress a gas other than air and also to vacuum pumps and so forth.

We claim:

1. A scroll fluid machine comprising:

a casing;

a fixed scroll member integral with said casing;

an orbiting scroll member orbitably provided in said casing to define a plurality of compression chambers between said orbiting scroll member and said fixed scroll member; and a rotation preventing mechanism for preventing said orbiting scroll member from rotating on its own axis, said rotation preventing mechanism comprising:
a first joint guide provided on said casing;
a second joint guide provided on a back of said orbiting scroll member;
said first and second joint guides each having sliding surfaces facing each other;
a movable joint provided between said first joint guide and said second joint guide and guided by said first and second joint guides in directions of two axes perpendicularly intersecting each other;
a resilient member provided between at least one of said first and second joint guides and said movable joint at a position adjacent to a part of at least one of said sliding surfaces such that said resilient member resiliently presses said movable joint against the other sliding surface of the same joint guide; and
said first and second joint guides each having at least four guide portions spaced apart from each other in the directions of said two axes, and said resilient member being provided on each non-loading-side guide portion of said guide portions such that said resilient member resiliently presses said movable joint toward a loading-side guide portion of said guide portions.

2. A scroll fluid machine according to claim 1, wherein said resilient member is a plate spring secured at one end thereof to said joint guide, another end of said plate spring being free end slidable along said joint guide, and a longitudinally intermediate portion of said plate spring being convexly curved so as to resiliently abut on said movable joint.

3. A scroll fluid machine according to claim 2, wherein said longitudinally intermediate portion of said plate spring is provided with a guide piece for guiding said movable joint between said joint guides.

4. A scroll fluid machine comprising:

a casing;

a fixed scroll member integral with said casing;

an orbiting scroll member orbitably provided in said casing to define a plurality of compression chambers between said orbiting scroll member and said fixed scroll member; and a rotation preventing mechanism for preventing said orbiting scroll member from rotating on its own axis, said rotation preventing mechanism comprising:
a first joint guide provided on said casing;
a second joint guide provided on a back of said orbiting scroll member;
said first and second joint guides each having sliding surfaces facing each other;
a movable joint provided between said first joint guide and said second joint guide and guided by said first and second joint guides in directions of two axes perpendicularly intersecting each other; and
a resilient member provided between at least one of said first and second joint guides and said movable joint at a position adjacent to a part of at least one of said sliding surfaces such that said resilient member resiliently presses said movable joint against the other sliding surface of the same joint guide, said resilient member being a plate spring secured at one end thereof to said joint guide, another end of said plate spring being a free end slidable along said joint guide, and a longitudinally intermediate portion of said plate spring being convexly curved so as to resiliently abut on said movable joint.

5. A scroll fluid machine according to clam 4, wherein said longitudinally intermediate portion of said plate spring is provided with a guide piece for guiding said movable joint between said joint guides.

* * * * *